United States Patent
Karuppusamy et al.

(10) Patent No.: US 12,524,379 B1
(45) Date of Patent: Jan. 13, 2026

(54) CLONING A CLUSTERED FILE SYSTEM

(71) Applicant: Dell Products L.P., Round Rock, TX (US)

(72) Inventors: Ramesh Kannan Karuppusamy, Bengaluru (IN); George Mathew, Belmont, CA (US); Murthy Mamidi, Queen Creek, AZ (US); Lomesh Meshram, Bangalore (IN); Arun Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/029,182

(22) Filed: Jan. 17, 2025

(51) Int. Cl.
*G06F 16/178* (2019.01)
*G06F 16/185* (2019.01)

(52) U.S. Cl.
CPC .......... *G06F 16/178* (2019.01); *G06F 16/185* (2019.01)

(58) Field of Classification Search
CPC ............................. G06F 16/178; G06F 16/185
USPC ........................................................ 707/639
See application file for complete search history.

(56) References Cited

U.S. PATENT DOCUMENTS

| | | | |
|---|---|---|---|
| 2008/0235474 A1* | 9/2008 | Hwang | G06F 12/0842 711/E12.091 |
| 2013/0159250 A1* | 6/2013 | Marcotte | G06F 16/178 707/610 |
| 2018/0046386 A1* | 2/2018 | Schuster | G06F 9/45558 |

* cited by examiner

*Primary Examiner* — Cam Y T Truong
(74) *Attorney, Agent, or Firm* — Staniford Tomita LLP

(57) ABSTRACT

A key value store is maintained in which the key value store includes pages of a B+ Tree structure holding file metadata of a logical partition of a filesystem. The pages are associated with keys through which the pages are retrieved from the key value store. The keys are named. A clone is created of the logical partition, the logical partition now being a parent and the clone now being a child. The naming of the keys is used to allow the pages stored in the key value store to be read by any of the parent or child. The naming of the keys is used to allow any of the parent or child to make updates to the pages, where updated pages are owned by a respective parent or child that made the updates, and pages not updated remain accessible by any of the parent or child.

15 Claims, 26 Drawing Sheets

---

Determine that a garbage collection (GC) should be performed
1510

↓

Obtain the routing keys
1515

↓

Examine pages of the routing keys, the examination thereby including pages referenced by any of the parent or child in the metadata group
1520

↓

Clean pages that are no longer referenced by any of the parent or child in the metadata group
1525

| Key Value Store | |
|---|---|
| <1:1:0> | page 0 |
| <1:1:1> | page 1 |
| <1:1:2> | page 2 |
| <1:1:3> | page 3 |
| <1:1:4> | page 4 |
| <1:1:5> | page 5 |
| <1:1:6> | page 6 |
| <1:1:7> | page 7 |
| <1:1:8> | page 8 |

FIG. 22

| Key Value Store | |
|---|---|
| <1:1:0> | page 0 |
| <1:1:1> | page 1 |
| <1:1:2> | page 2 |
| <1:1:3> | page 3 |
| <1:1:4> | page 4 |
| <1:1:5> | page 5 |
| <1:1:6> | page 6 |
| <1:1:7> | page 7 |
| <1:1:8> | page 8 |
| <1:2:0> | new page 0 |

FIG. 23

| Key Value Store | |
|---|---|
| <1:1:0> | page 0 |
| <1:1:1> | page 1 |
| <1:1:2> | page 2 |
| <1:1:3> | page 3 |
| <1:1:4> | page 4 |
| <1:1:5> | page 5 |
| <1:1:6> | page 6 |
| <1:1:7> | page 7 |
| <1:1:8> | page 8 |
| <1:2:0> | overwritten page 0 |

FIG. 24

| Key Value Store | |
|---|---|
| <1:1:0> | page 0 |
| <1:1:1> | page 1 |
| <1:1:2> | page 2 |
| <1:1:3> | page 3 |
| <1:1:4> | page 4 |
| <1:1:5> | page 5 |
| <1:1:6> | page 6 |
| <1:1:7> | page 7 |
| <1:1:8> | page 8 |
| <1:2:0> | overwritten page 0 |
| <2:2:1> | new page 1 |

FIG. 25

| Key Value Store | |
|---|---|
| <1:1:0> | page 0 |
| <1:1:1> | page 1 |
| <1:1:2> | page 2 |
| <1:1:3> | page 3 |
| <1:1:4> | page 4 |
| <1:1:5> | page 5 |
| <1:1:6> | page 6 |
| <1:1:7> | page 7 |
| <1:1:8> | page 8 |
| <1:2:0> | overwritten page 0 |
| <2:2:1> | new page 1 |
| <1:2:1> | new page 1 |

FIG. 26

CLONING A CLUSTERED FILE SYSTEM

CROSS-REFERENCE TO RELATED APPLICATIONS

This application is related to co-pending U.S. patent application Ser. Nos. 19/029,391, filed Jan. 17, 2025 and 19/029,566, filed Jan. 17, 2025, which are incorporated herein by reference for all purposes.

TECHNICAL FIELD

The present invention relates generally to information processing systems, and more particularly to large scale file systems.

BACKGROUND

A deduplicated filesystem is a type of filesystem that seeks to reduce the amount of redundant data that is stored in order conserve storage space. Deduplication may be achieved by storing only unique instances of data blocks or segments, regardless of how many times they appear in the filesystem. Deduplication is particularly valuable in environments with a high degree of redundancy, such as backup systems, virtual environments, or file-sharing platforms. A deduplicated file system relies on an organization of metadata to conduct deduplication operations efficiently and retrieve data segments. It can be desirable to replicate a file set contained within a deduplicated filesystem. Such a need may arise in cases of on-going application development (e.g., replicate a production data set so that development can continue with the replicated set rather than the production). Other instances where such a need may arise include cases of disaster recovery.

Replicating, however, a file set that may contain tens or even hundreds of millions of files can require a large amount of time and compute resources due, in part, to the metadata maintained by the file system to support deduplication.

Thus, there is a need for improved systems and techniques to handle replication whether it is on a single appliance or between multiple appliances.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY

A key value store is maintained in which the key value store includes pages of a B+ Tree structure holding file metadata of a logical partition of a filesystem. The pages are associated with keys through which the pages are retrieved from the key value store. The keys are named. A clone is created of the logical partition, the logical partition now being a parent and the clone now being a child. The naming of the keys is used to allow the pages stored in the key value store to be read by any of the parent or child. The naming of the keys is used to allow any of the parent or child to make updates to the pages, where updated pages are owned by a respective parent or child that made the updates, and pages not updated remain accessible by any of the parent or child.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 22 shows a state of the file system after a clone child has been made, according to one or more embodiments.

FIG. 23 shows a state of the file system after a copy-on-write, according to one or more embodiments.

FIG. 24 shows a state of the file system after a page is overwritten, according to one or more embodiments.

FIG. 25 shows a state of the file system after a copy-on-write, according to one or more embodiments.

FIG. 26 shows a state of the file system after a copy-on-write, according to one or more embodiments.

DETAILED DESCRIPTION

Figure 1:
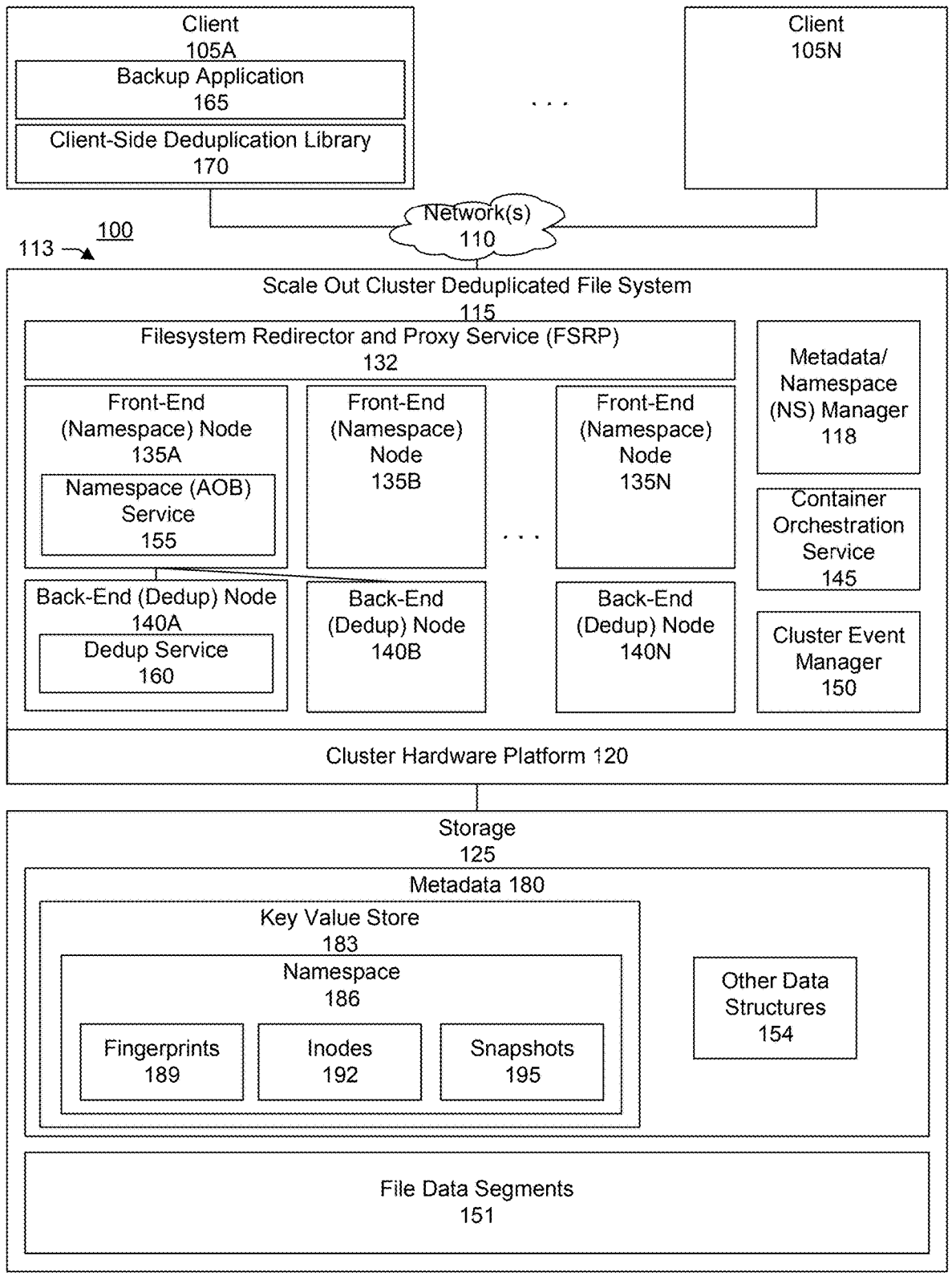
FIG. 1 shows a block diagram of an information processing system having a clustered file system within a clone may be generated, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks shown in the figures may be functional and there can be many different hardware and software configurations to implement the functions described.

FIG. 1 shows a simplified block diagram of an information processing system 100 within which methods and systems for cloning a clustered filesystem. The example shown in FIG. 1 includes a set of clients 105A-N connected via a network 110 to a data protection appliance 113. The data protection appliance includes a deduplication filesystem 115 and file system metadata manager 118. The file system metadata manager may be referred to as a namespace manager (NS). The metadata or namespace manager is responsible for managing metadata associated with different logical partitions of the file system. A logical partition may be referred to as a management tree (mtree). The management of the metadata may include, for example, handling the process to clone a logical partition. In an embodiment, systems and techniques are provided for a cloning scheme based on a deduplication file system implementation of a namespace developed using write-in place key-value store constructs. Systems and techniques are provided to trace the hierarchy of chains and provide metadata sharing to help compartmentalize namespace enumerations that are often dependent on map-reduce schemes to facilitate applications like garbage collection and other processes.

The file system is hosted by an underlying hardware platform 120 which, in turn, is connected to a storage system 125. In an embodiment, the filesystem is a clustered or distributed file system. That is, the file system runs or is hosted across multiple (e.g., two or more) nodes connected to each other such as via a network or other connection scheme. In this embodiment, the data protection appliance may be referred to as a scale out appliance, scale out cluster, or scale out file system. Depending on demand, cluster nodes or services may be dynamically scaled up or down. For example, as part of on-going operations to meet changes in demand, new nodes or new instances of a service may be added to the cluster or existing nodes or instances of a service may be removed from the cluster.

This file system includes a filesystem redirector and proxy service (FSRP) 132, a set of front-end nodes or services 135A-N, a set of back-end nodes or services 140A-N, a container orchestration service 145, and a cluster event manager 150.

The file system provides a way to organize data stored in a storage system and present that data to clients and applications in a logical format. The file system organizes the data into files and folders into which the files may be stored. When a client requests access to a file, the file system issues a file handle or other identifier for the file to the client. The client can use the file handle or other identifier in subsequent operations involving the file. A namespace of the file system provides a hierarchical organizational structure for identifying file system objects through a file path. A file can be identified by its path through a structure of folders and subfolders in the file system. A file system may hold many hundreds of thousands or even many millions of files across many different folders and subfolders and spanning thousands of terabytes.

In an embodiment, the front-end nodes host front-end services 155. These front-end services may be referred to as access object (AOB) services and are responsible handling namespace operations and file access requests including file and folder creation and deletion, and random input/output (IO) reads and writes. As such, the front-end nodes may be referred to as namespace nodes or access object nodes. In an embodiment, namespace nodes are cluster nodes or a microservice that collectively hosts a cluster wide namespace. A namespace service refers to a service responsible for managing namespace across the cluster.

The back-end nodes host back-end services for handling compression and deduplication 160. As such, the back-end nodes may be referred to as deduplication or dedup nodes. In an embodiment, dedup nodes are cluster nodes or a microservice that collectively hosts the backup data. A node of a cluster may be a container, server, or virtual server.

The filesystem redirector and proxy service provides an entry point for a data path of the appliance. In an embodiment, initial connection requests by clients to the data protection appliance are handled by the filesystem redirector and proxy service. The filesystem redirector and proxy service determines which namespace node or AOB node should handle the request and then redirects the request to the appropriate namespace or AOB node. In an embodiment, the determination is based on a load-balancing algorithm that attempts to distribute incoming traffic evenly across the multiple namespace or AOB nodes. FSRP also attempts to route an incoming workload protection request of a given file or directory to the same or consistent node or AOB service. File data, metadata, or both may be cached in the node or AoB service. Hence routing the request to the same node or AOB service that previously worked on the file helps to reduce cache invalidations. Namespace data is also cached as pages in the node or AOB service. So routing the request to the same node or AOB service allows for reducing namespace page invalidations.

More particularly, in an embodiment, the client-side library receives an Internet Protocol (IP) address of the namespace or AOB node identified by FSRP as part of the redirection and issues a remote procedure call (RPC) for the file system operation request to the identified front-end or AOB node. In an embodiment, any AoB can handle namespace operations and file access, but different AoBs may be assigned responsibility for different ranges of files. Based on a hash of a file handle, path, or other information associated with a file, the filesystem redirector and proxy service attempts to redirect or route associated data protection traffic to a particular access object service in a consistent manner so that future writes and/or reads of the same file are routed consistently to the same access object service. Consistent routing or redirection by FSRP enables the AoBs to cache state in memory that may be reused for other accesses. Consistent routing further helps to reduce locking, coordination, and collision issues among different AoBs because each AoB can operate on its assigned range of files independent of another AoB that may be assigned a different range of files. An AoB attempts to keep necessary state in memory for efficiency. The state, however, is globally available and can be handled by other AoB instances in case of an instance failure or other unavailability. The files or, more particularly, file handle hash ranges can be dynamically reassigned to the AoBs to maintain a balance across currently available AoBs. A more detailed description of FSRP is provided in U.S. patent application Ser. No. 18/428,717, filed, Jan. 31, 2024, which is incorporated by reference along with all other references cited.

In an embodiment, the file system is implemented as a set of microservices (e.g., front-end microservices and back-end microservices) running as containers. The file system uses the underlying storage system for persistence. The container orchestration service is responsible for managing the microservices such as adding a new instance of a front-end service, back-end service, or both to accommodate an increase in demand and thus ensure good performance for clients that may be accessing the file system and requesting file system operations. Alternatively, the orchestration service may remove an existing instance of a front-end service, back-end service, or both to accommodate a decrease in demand and thus reduce costs associated with resources needed to run the services. The number of instances of each microservice can change based on demand. An example of a container orchestration service is Kubernetes. Kubernetes is an open-source container-orchestration system for automating computer application deployment, scaling, and management.

A container is a virtualized computing environment to run an application program as a service or, more specifically, microservice. Thus, in an embodiment, the file system microservices, including namespace and deduplication services, run inside a virtualized environment provided by the orchestration service. The container orchestration layer can run on a single or multiple physical or virtual nodes. Containers are similar to virtual machines (VMs). Unlike VMs, however, containers have relaxed isolation properties to share the operating system (OS) among the containerized application programs. Containers are thus considered lightweight. Containers can be portable across hardware platforms including clouds because they are decoupled from the underlying infrastructure. Applications are run by containers as microservices with the container orchestration service facilitating scaling and failover. For example, the container orchestration service can restart containers that fail, replace containers, kill containers that fail to respond to health checks, and will withhold advertising them to clients until they are ready to serve.

The cluster event manager communicates with the orchestration service for cluster updates and is a service that is responsible for sending events about changes in the cluster such as node addition/deletion or service addition/deletion. In an embodiment, these events detail changes to the cluster and are sent from the cluster event manager to FSRP or the front-end or namespace nodes which, in turn, forward the cluster change events to the clients.

Installed at each client is a client application such as a backup application 165 and client-side deduplication library 170. In an embodiment, the clients may be referred to as backup clients. The file system provides a backup target for data generated by the clients. In an embodiment, when the backup application seeks to perform a file system operation, the backup application issues a call (e.g., application programming interface (API) call) to the client-side deduplication library to request the file system operation. The client-side deduplication library processes and forwards the request to the data protection appliance for fulfillment. The results of the request are returned by the data protection appliance to the client-side library which, in turn, passes the results back to the requesting client application. An example of a client-side deduplication library is Data Domain Boost (DDBoost) as provided by Dell Technologies of Round Rock, Texas. Some embodiments are described in conjunction with the DDBoost protocol, Data Domain Restorer (DDR) storage system, and Data Domain file system as provided by Dell Technologies. It should be appreciated, however, that principles and aspects discussed can be applied to other file systems, file system protocols, and backup storage systems.

In an embodiment, the clients access the file system using a protocol referred to as DDBoost. Thus, the clients may be referred to as DDBoost clients. The clients (e.g., DDBoost clients) connect to the namespace nodes to perform file operations for backup jobs, restore jobs, or other data protection operations. DDBoost is a system that distributes parts of a deduplication process to the application clients, enabling client-side deduplication for faster, more efficient backup and recovery. In an embodiment, the clients use the DDBoost backup protocol to conduct backups of client data to the storage system, restore the backups from the storage system to the clients, or perform other data protection operations. The DDBoost library exposes application programming interfaces (APIs) to integrate with a Data Domain system using an optimized transport mechanism. These API interfaces exported by the DDBoost library provide mechanisms to access or manipulate the functionality of a Data Domain file system. Embodiments may utilize the DDBoost File System Plug-In (BoostFS), which resides on the application system and presents a standard file system mount point to the application. With direct access to a BoostFS mount point, the application can leverage the storage and network efficiencies of the DDBoost protocol for backup and recovery. A client may run any number of different types of protocols as the file system supports multiple network protocols for accessing remote centrally stored data (e.g., Network File System (NFS), Common Internet File System (CIFS), Server Message Block (SMB), and others).

The clients may include servers, desktop computers, laptops, tablets, smartphones, internet of things (IoT) devices, or combinations of these. The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The storage includes, in addition to user file data segments 151, metadata 180. The metadata facilitates organization of the user file data segments, deduplication, access to the data via file system protocols, point-in-time recoveries, search, and so forth. In an embodiment, storage includes a key value store (KVS) 183 holding a namespace 186 of the file system. The namespace may include fingerprints 189, inodes 192, and snapshots 195. Discussion of a key value store to hold a namespace of a file system is provided in U.S. patent application Ser. No. 17/869,507, filed Jul. 20, 2022, and is incorporated by reference along with all other references cited in this application.

As discussed, in an embodiment, the file system is a deduplication file system. Data, such as files from the clients to be backed up are divided into a set of segments. The segments are hashed to generate a set of fingerprints. These fingerprints uniquely identify the segments. The data protection system maintains metadata separate from the actual client or user data being backed up. The metadata includes a collection of fingerprints corresponding to data segments that already exist on the backup storage system. If the fingerprint of a data segment from a file to be backed up does not match an existing fingerprint, the data segment is written to the physical disk storage of the storage system and the fingerprint is added to the collection of existing fingerprints. If, however, the fingerprint matches an existing fingerprint, the data segment is determined to be a duplicate and is not written to the storage system. Instead, a reference is generated that points to the already existing data segment on backup storage that corresponds to the fingerprint. The reference is stored as metadata by the data protection system so that the file can be reconstructed or reassembled as part of a restore or other operation requesting the file.

Figure 2:
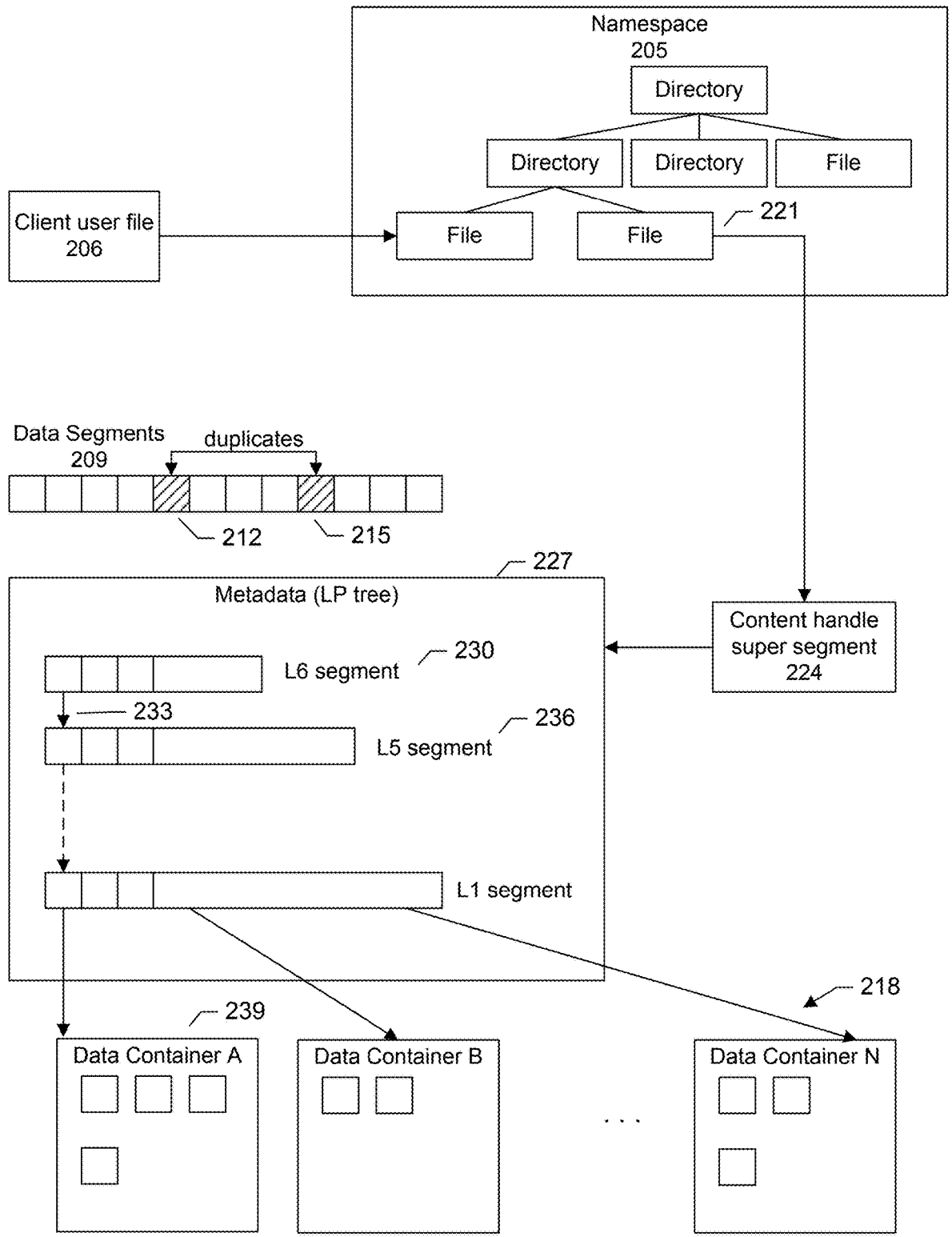
FIG. 2 shows an example of an overview of a deduplication process, according to one or more embodiments.

More particularly, FIG. 2 shows a block diagram illustrating a deduplication process of the file system according to one or more embodiments. The file system maintains a namespace 205. The process of backing up a file to the file system may be referred to as ingest. As data, such as incoming client user file 206, enters the file system, it is segmented into data segments 209 and filtered against existing segments to remove duplicates (e.g., duplicate segments 212, 215). A segment that happens to be the same as another segment that is already stored in the file system may not be again stored. This helps to eliminate redundant data and conserve storage space. Metadata, however, is generated and stored that allows the file system to reconstruct or reassemble the file using the already or previously stored segment. Metadata is different from user data. Metadata may be used to track in the file system the location of the user data within a shared storage pool. The amount of metadata may range from about 2 or 4 percent the size of the user data.

The file system maintains among other metadata structures a fingerprint index. The fingerprint index includes a listing of fingerprints corresponding to data segments already stored to the storage pool. A cryptographic hash function (e.g., Secure Hash Algorithm 1 (SHA1)) is applied to segments of the incoming file to calculate the fingerprints (e.g., SHA1 hash values) for each of the data segments making up the incoming file. The fingerprints are compared to the existing fingerprints in the fingerprint index. Matching fingerprints indicate that corresponding data segments are already stored. Non-matching fingerprints indicate that the corresponding data segments are unique and should be stored.

Unique data segments are packed and stored in fixed size immutable containers 218. There can be many millions of containers tracked by the filesystem. The fingerprint index is updated with the fingerprints corresponding to the newly stored data segments. A content handle 221 of the file is kept in the file system's namespace to support the directory hierarchy. The content handle points to a super segment 224 which holds a reference to a top of a segment tree 227 of the file. The super segment points to a top reference 230 that points 233 to metadata 236 and data segments 239.

Thus, in a specific embodiment, each file in the file system may be represented by a tree. The tree includes a set of segment levels arranged into a hierarchy (e.g., parent-child). Each upper level of the tree includes one or more pointers or references to a lower level of the tree. A last upper level of the tree points to the actual data segments. Thus, upper level segments store metadata while the lowest level segments are the actual data segments. In an embodiment, a segment in an upper level includes a fingerprint (e.g., metadata) of fingerprints of one or more segments in a next lower level (e.g., child level) that the upper level segment references.

A tree may have any number of levels. The number of levels may depend on factors such as the expected size of files that are to be stored, desired deduplication ratio, available resources, overhead, and so forth. In a specific embodiment, there are seven levels L6 to L0. L6 refers to the top level. L6 may be referred to as a root level. L0 refers to the lowest level. Thus, the upper segment levels (from L6 to L1) are the metadata segments and may be referred to as LPs. That is, the L6 to L1 segments include metadata of their respective child segments. The lowest level segments are the data segments and may be referred to as L0s or leaf nodes. In an embodiment, segments in the filesystem are identified by 24 byte keys (or the fingerprint of a segment), including the LP segments. Each LP segment contains references to lower level LP segments.

Figure 3:
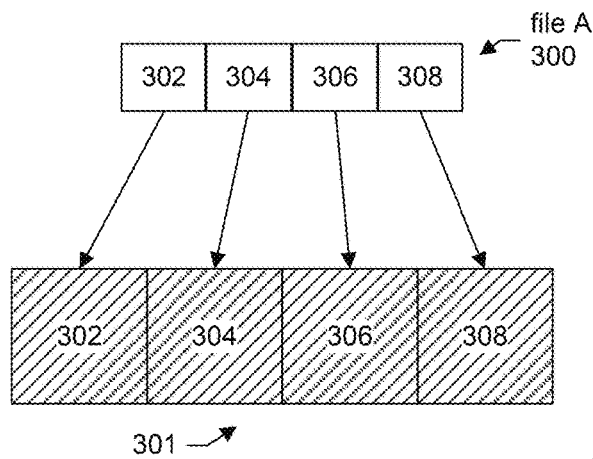
FIG. 3 shows an example of a deduplication process of a filesystem in a first state, according to one or more embodiments.
Figure 4:
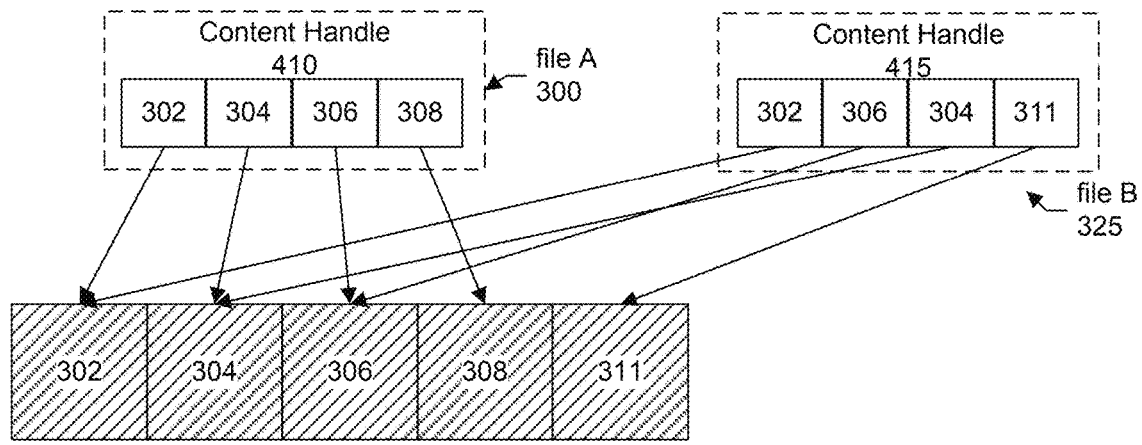
FIG. 4 shows an example of the deduplication process of the filesystem in a second state, according to one or more embodiments.
Figure 5:
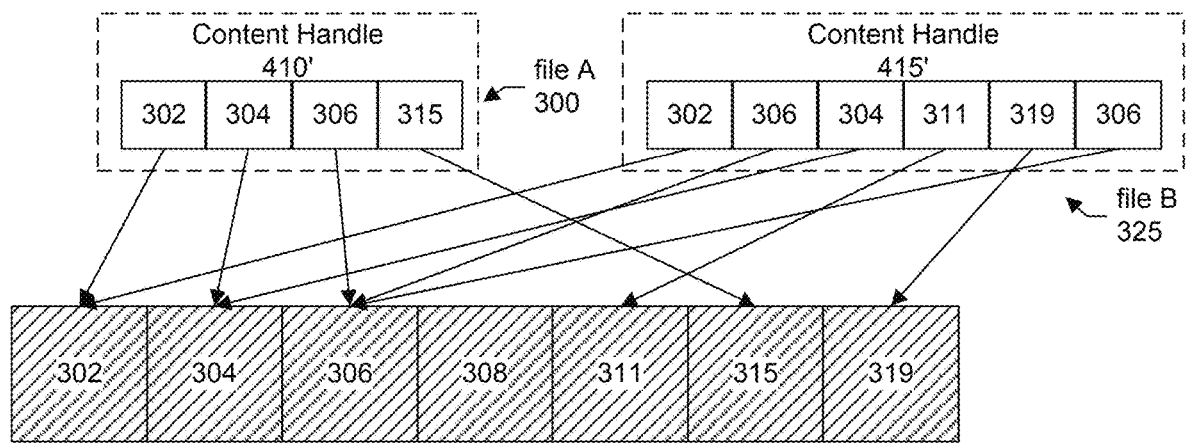
FIG. 5 shows an example of the deduplication process of the filesystem in a third state, according to one or more embodiments.

FIGS. 3-5 show further detail of a deduplication process. FIG. 3 shows an example of the file system in a first state. As client user file A 300 enters the file system, it is segmented into data segments 301. Identifiers are calculated for the segments. In an embodiment, the identifiers include fingerprints. A cryptographic hash function (e.g., Secure Hash Algorithm 1 (SHA1)) is applied to the segments to calculate the fingerprints (e.g., SHA1 hash values) for each of the data segments making up the incoming file. In the example shown in FIG. 3, the fingerprints are 302, 304, 306, and 308. A fill pattern indicates the data segments corresponding to the fingerprints.

FIG. 4 shows an example of the filesystem in a second state, after the first state. A client user file B 325 has likewise been segmented into data segments. Fingerprints (302, 306, 304, and 311) have been calculated for each of the segments and filtered against existing segments to remove duplicates (e.g., duplicate segments 302, 306, and 304). New or non-redundant segments (e.g., 311) are stored. Thus, a segment not having matching fingerprints may be stored. A segment that happens to be the same as another segment (based on having matching fingerprints) may not be again stored. This helps to eliminate redundant data and conserve storage space.

Metadata, however, is generated and stored that allows the filesystem to reconstruct or reassemble the file using the already stored or previously stored and existing segments. Since the files share some identical segments, referencing the segments using the fingerprints allows a single instance of a particular segment to be stored, thus reducing redundant or duplicate data. The fingerprints or identifiers referencing the segments are substantially less in size that the actual data segments themselves.

FIG. 5 shows an example of the filesystem in a third state, after the first and second states. In this example, the files have been modified such that file A references segment 315 instead of 308. File B references a new segment 319 in addition to segments 302, 306, 304, 308, and 311, and has an additional reference to segment 306.

Each file is associated with a content handle (CH) that represents data content of a file at a particular point-in-time. A content handle of a file may be generated based on an ordered collection of fingerprints corresponding to data segments making up the file. For example, referring back now to a state of the file system as shown in FIG. 4, file A has a content handle 410 based on fingerprints 302, 304, 306, and 308. File B has a content handle 415 based on fingerprints 302, 306, 304, and 311. In the example of FIG. 5, however, the content handles for files A and B are now 410' and 415', respectively, to indicate that they have changed based on their modifications. In other words, content handle 410 is different from content handle 410'; and content handle 415 is different from content handle 415'. A content handle may be viewed as a compact snapshot of a file's data contents. The content handle of a file thus encodes content of the file into a name of the file.

Referring back now to FIG. 1, an inode is another type of data structure that may be stored by the file system. In an embodiment, each file in the filesystem is associated with an inode. The inode associated with a file stores metadata about the file. An inode includes an inode number. The inode number uniquely identifies the inode from among other inodes in the filesystem. Other attributes of the inode may include a size indicating a size of a file associated with the inode, date created indicating a time and date the file was created, date modified indicating a time and date the file was last modified, a set of data pointers, and other attributes (e.g., file owner, file permissions, and so forth). The data pointers store location information or addresses mapping the inode to the actual data.

Snapshots are point-in-time copies of the file system or, more particularly, point-in-time copies of logical partitions of the file system. Snapshots can be used to restore the file system to a previous state, preserve a moment in time for reference or for later use, assist with testing and debugging by reproducing a particular state of the filesystem, disaster recovery, and so forth. Snapshots can be created very quickly because they are logical rather than actual copies of data. For example, it can be much faster to designate an area on disk for a snapshot and use pointers to data as compared to copying the entire actual source data. In particular, a snapshot includes a set of reference markers or pointers to the actual data.

In an embodiment, the file system can be divided into multiple logical partitions that may be referred to as management trees or mtrees. An mtree is a directory structure within the file system and is represented by a B+ tree. These logical partitions or mtrees may behave as independent file systems and allow for the logical separation of data stored on the appliance for different applications, departments, or backup workflows. Each mtree or logical partition is a mountable directory hierarchy. An mtree or logical partition may be identified by an identifier referred to as a logical partition identifier (id) or mid.

In other words, the file system may host multiple management trees in the file system. Each of these management trees can be considered as a separate filesystem for external clients. Each management tree or mtree is independent of another mtree. Thus, in an embodiment, files (and directories) of a namespace of the file system are stored in a logical partition referred to as an mtree. The mtree contains a set of files that has a root followed by a deep hierarchy of directories and files. The mtree relies on a B+ tree as the underlying data structure to manage its data. The B+ tree provides indexing for files and deduplicated segments within an mtree and allows for quick lookup of data and efficient handling of large data sets. An mtree uses the B+ tree to map file metadata to deduplicated data blocks, track segment fingerprints (hash values) for deduplication, store file metadata (e.g., file name, permissions, timestamps, and the like), and support directory traversal and quick location of files. A file may be written to an mtree by breaking the file into deduplicated segments and calculating each segment's hash value. The hash values are indexed using the B+ tree. When the file is accessed, the mtree consults the B+ tree to locate the deduplicated segments and reassemble the file. In an embodiment, systems and techniques provide for the cloning of an mtree (e.g., management tree or logical partition). The mtree metadata is managed by the file system metadata manager or namespace (NS) manager.

Figure 6:
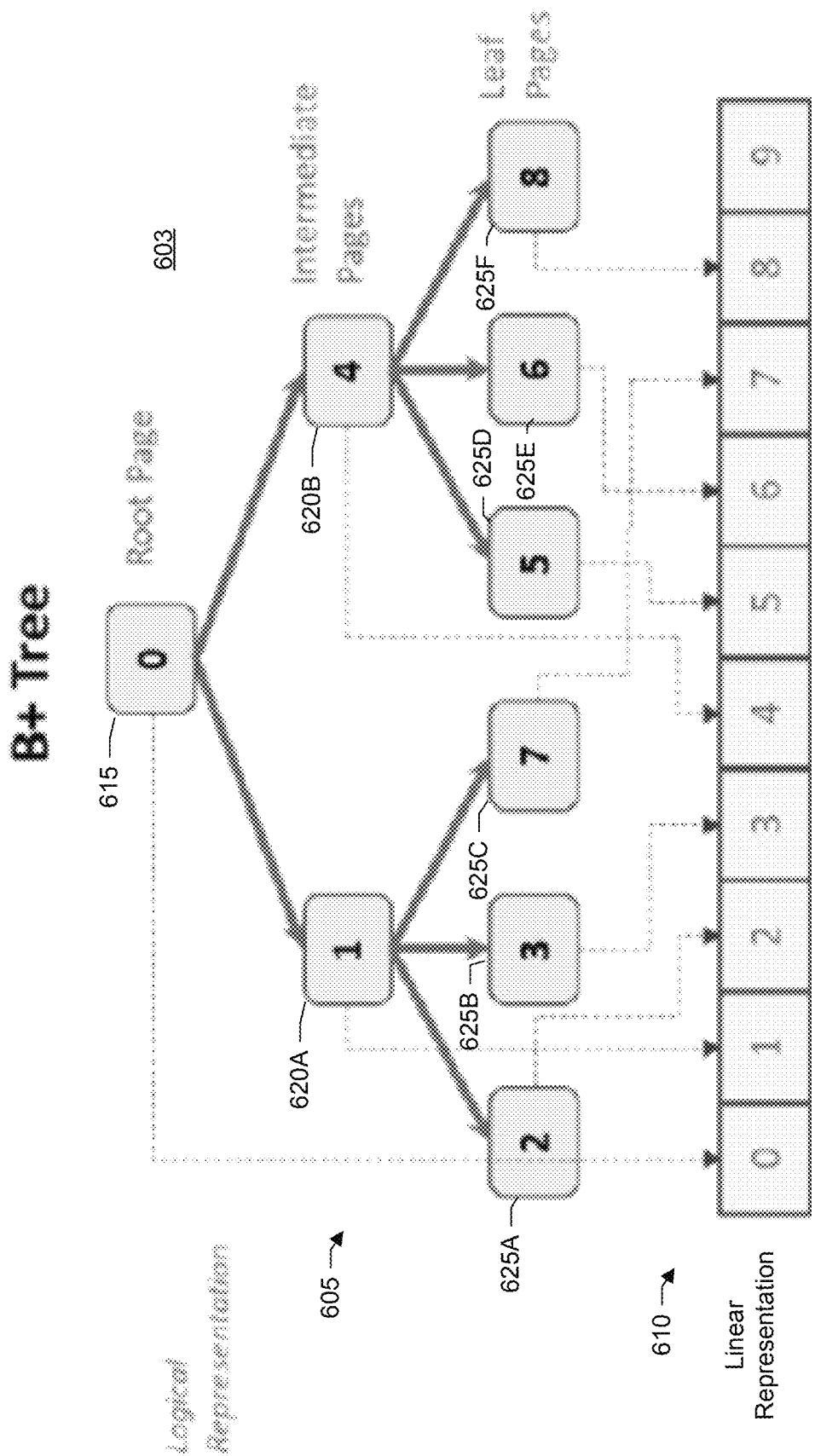
FIG. 6 shows an example of a namespace, according to one or more embodiments.

FIG. 6 shows further detail of a namespace of the file system. In an embodiment, the namespace is represented by a B+ tree data structure where pages of the tree are written to a key-value store. Page identifiers form the keys of the key-value store and page content form the values of the key-value store. The tree data structure includes the folder and file structure as well as file inodes. FIG. 6 shows an example of a B+ Tree 603 in a logical representation 605 and a linear representation 610. In this example, there is a root page 615, intermediate pages 620A,B, and leaf pages 625A-F. The broken lines shown in FIG. 6 map the pages from their logical representation in the tree to their representation as a linear sequential set of pages on disk, e.g., flattened on-disk layout. In other words, the tree may be represented as a line of pages of data.

The intermediate pages store lookup keys that reference other intermediate or leaf pages. An intermediate page may be referred to as an INT page and references other INT pages or leaf pages by interior keys.

In an embodiment, the actual file metadata is contained in the B+ tree leaf page. The leaf page contains keys. Each key is formed as a "key/value" pair. In an embodiment, a key is a 128-bit number kept in sorted order on the page. It is accompanied by a "value" which is an index to data associated with that key and may be referred to as a "payload."

Figure 7:
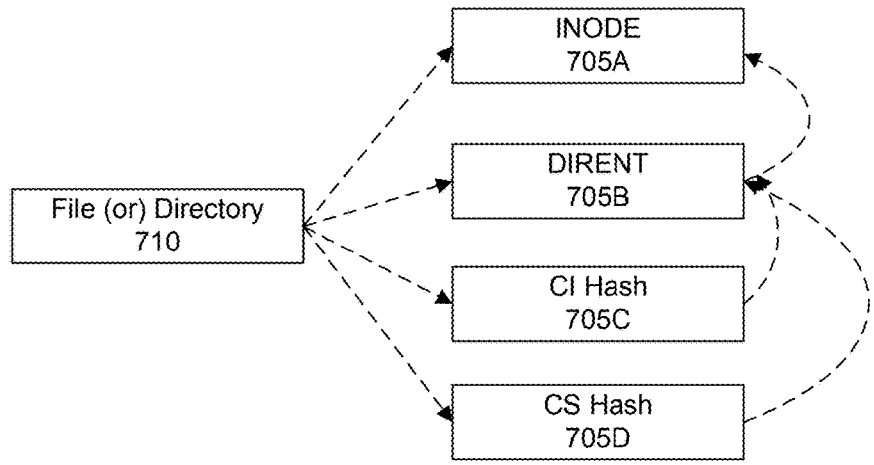
FIG. 7 shows a block diagram of key+value pairs representing a file in a logical partition of the file system, according to one or more embodiments.

FIG. 7 shows a block diagram of keys 705A-D for a file (or directory) 710. In an embodiment, each file in the file system Mtree is represented by four "key/value" pairs. That is, there is a key and a payload for the key. Specifically, INODE key 705A contains the file metadata which, in turn, contains the content handle. As discussed, the content handle is a reference to the segment tree that represents file data. DIRENT key 705B contains a reference to the INODE key and two hash keys. CI Hash key 705C and CS Hash key 705D are used for name-based lookups of the file. Specifically, the CS_HASH key contains a hash of the file name in a case-sensitive way, and the CI_HASH contains a case-insensitive hash of the file name. Thus, in this embodiment, there are four different types of information stored in a B+ Tree for a particular file. A leaf page may contain the keys for about 200 files.

Figure 8:
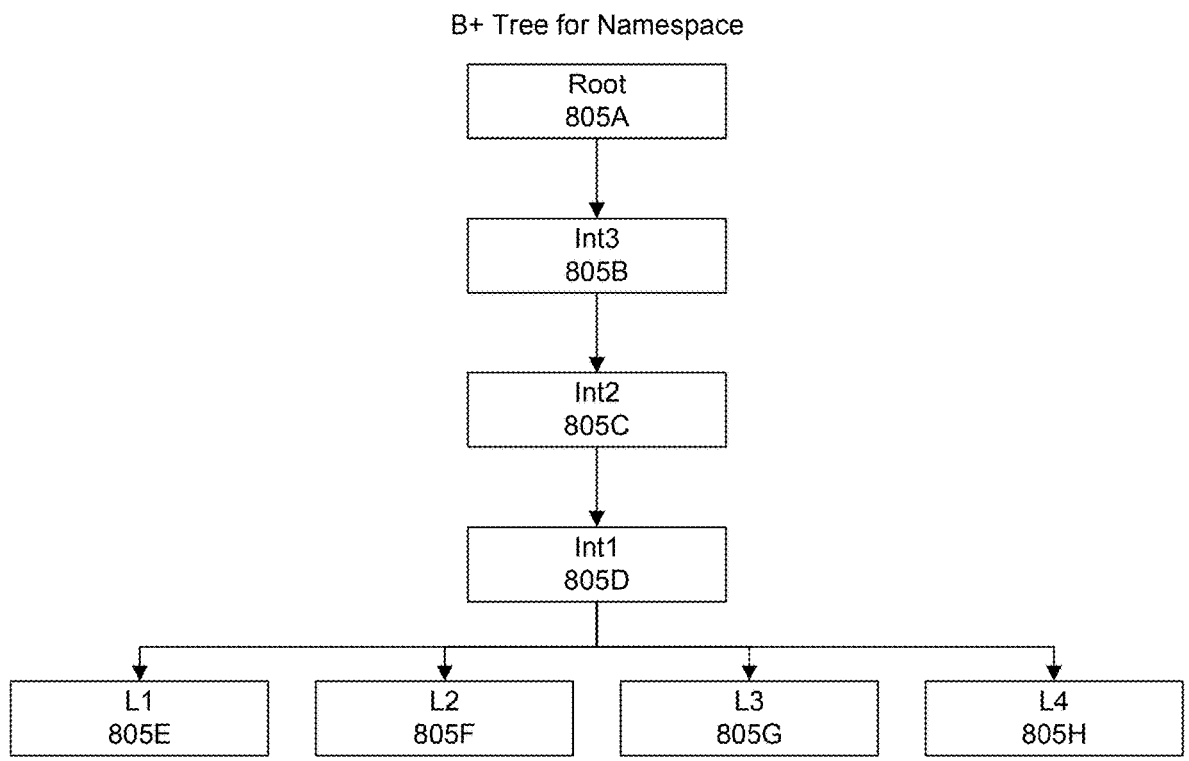
FIG. 8 shows an example of a structure of a B+ Tree, according to one or more embodiments.

FIG. 8 shows another example of a structure of a B+ Tree that may be stored for a particular file. This example of the B+ Tree includes five levels including a root page level, three intermediate page levels (Int3, Int2, and Int1), and a leaf page level (L1, L2, L3, and L4). In an embodiment, each page in the B+ Tree is stored as a key+value in a KVS table. The payload of the inode key in the B+ Tree leaf page contains the KVS key for an inode payload stored in KVS in a separate table.

The B+ Tree is persisted in a key value store. Each page has a key value in the key value store. Thus, in the example shown in FIG. 8, the B+ Tree includes eight pages 805A-H. So, there are eight different keys stored in the KVS table corresponding to the eight different pages. Persisting to the key value store includes forming a key and storing the key and its corresponding page or payload in the key value store. Locating a particular file may include traversing the tree from the root page to the intermediate pages and then to the leaf page where information for the particular file is stored.

Figure 9:
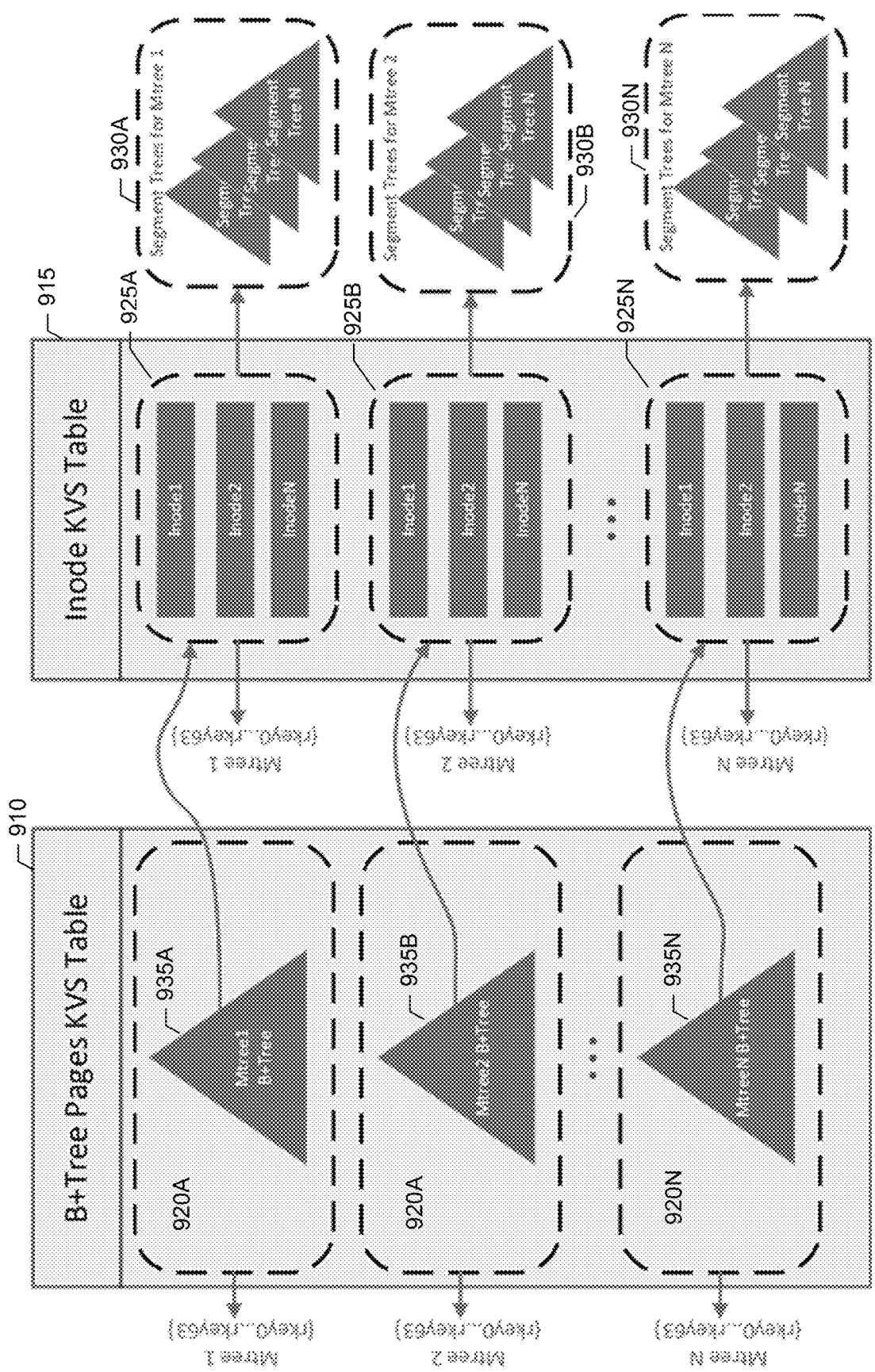
FIG. 9 shows an overview of metadata management in the file system, according to one or more embodiments.

FIG. 9 shows an overview of the metadata management. As shown in the example of FIG. 9, the B+ Tree pages for all mtrees are stored in a single KVS table 910. Similarly, the file metadata (inode payload) for all the files in all the mtrees are stored in a single KVS table 915.

More specifically, in an embodiment, the key value store includes B+ Tree pages KVS table 910 and inode KVS table 915. As discussed, there can be multiple logical partitions or mtrees 920A-N in the file system. In an embodiment, all the logical partitions or mtrees are stored in a single B+ Tree pages KVS table. A B+ Tree may contain many millions of pages. Logically partitioning the table across the cluster can help to achieve parallelism. In an embodiment, there can be up to 1024 logical partitions.

Likewise, inode payload sets 925A-N corresponding to the logical partitions or mtrees are stored in a single inode KVS table. The inode payload sets map to corresponding segment trees 930A-N. The separation into different tables helps to facilitate performance of the file system. Thus, accessing a particular inode's data includes accessing the B+ Tree KVS table with a key corresponding to a specific page in the B+ Tree and looking up an inode key from the page. The payload of the inode key identifies the KVS key from which the full information for the inode may be retrieved.

Each logical partition or mtree is identified using an identifier that may be referred to as an mtree identifier or mid. The mtree identifier allows for differentiating the different mtrees that are all stored in the same KVS table. In an embodiment, the mid is included in the key names for the different mtrees. That is, the identifier becomes part of the key for each page. Consider, as an example, an mtree having an mid of m1 and B+ tree 935A belongs to m1. In this case, the keys in the key value store for each page associated with B+ tree 935A includes "m1." In an embodiment, the keys start with the mid and include a page number of a page in the B+ Tree. The mid allows for a logical separation of the pages and keys for each mtree. A mid and page number can be used to uniquely identify a page of a B+ Tree for a particular mtree.

Figure 10:
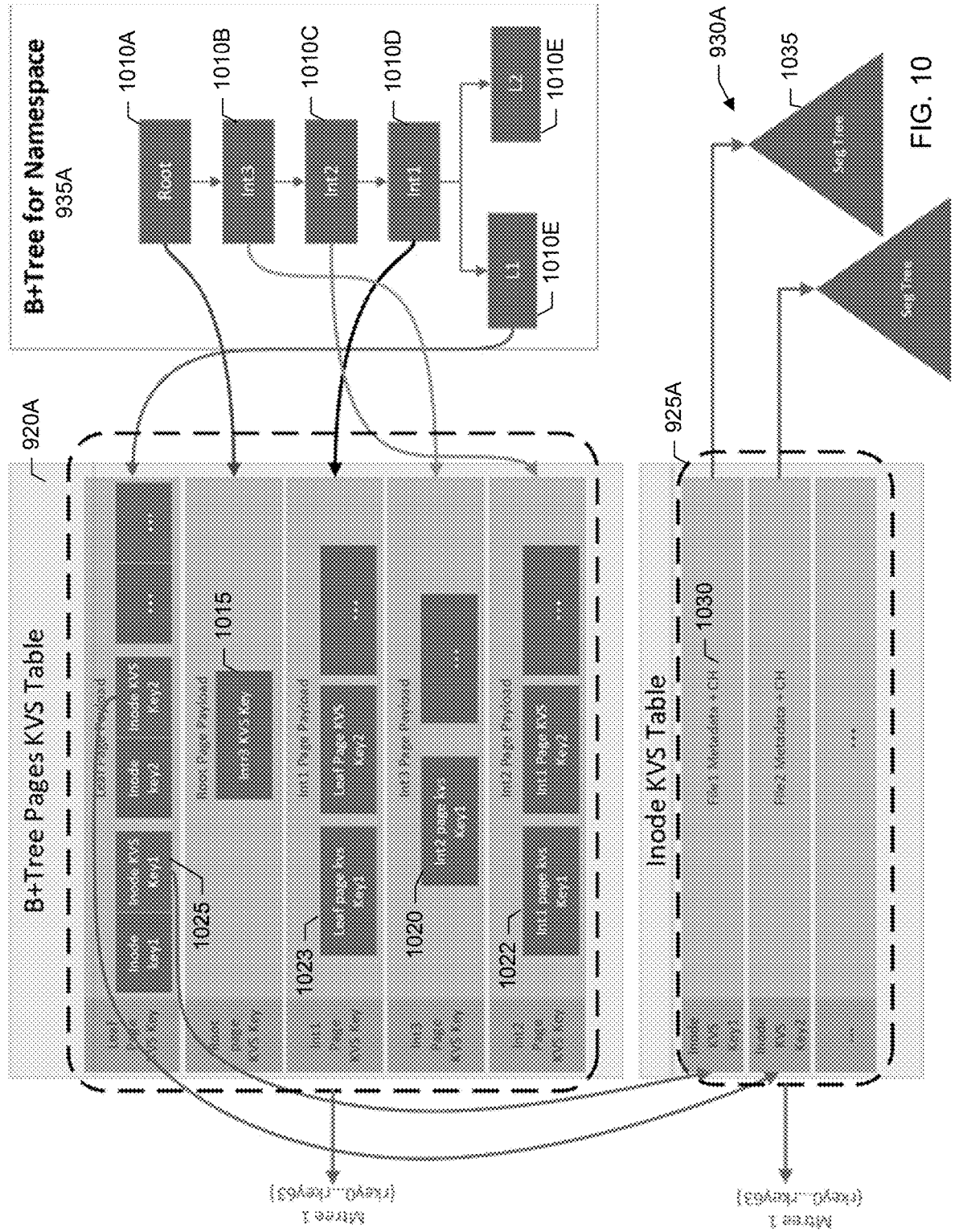
FIG. 10 shows a detailed view of metadata management for a particular logical partition, according to one or more embodiments.

FIG. 10 shows a detailed view of the metadata representation for a single mtree. Specifically, there is B+ Tree 935A holding a namespace, B+ Tree pages KVS table 920A, inode KVS table 925A, and segment trees 930A. In the B+ Tree, a root page 101A points to an intermediate page 1010B (INT 3), which points to an intermediate page 1010C (INT 2), which points to an intermediate page 1010D (INT 1), which points to leaf pages 1010E (L1) and 1010F (L2), respectively.

To locate data of a file, a KVS key for the root page 101A is read. A payload of the root page includes a KVS key 1015 for the INT 3 page. A payload of the INT 3 page is read to obtain a KVS key 1020 for the INT 2 page. A payload of the INT 2 page is read to obtain a KVS key 1022 for the INT 1 page. A payload of the INT 1 page is read to obtain a KVS key 1023 for leaf page 1010E.

A payload of the leaf page is read to obtain an inode KVS key 1025 for an inode of the file data. Specifically, a payload of the inode KVS key contains metadata of the file including a content handle (CH) 1030. The content handle, in turn, references a segment tree 1035 of the file. As discussed, the content handle is unique for every copy of the file. For example, a change of singly byte in the file results in a change in the content handle.

It is desirable for file systems and block-based implementations to support some form of cloning, which may be referred to as snapshots or check points. However, these constructs may support only static and point-in-time images of a stabilized file system or block storage. Their use is somewhat limited to disaster recovery or preservation of time-based intent.

However, in other use cases such as parallel and experimental development environments it is desirable to support a main file set with a production application in use, while development work, experimental work, or both live off the same file set. In these use cases both views of the file sets may start their life identically in content, but may start diverging in their metadata and data footprint as each limb makes progress in its usage. This effectively makes a derivative file set as a clone of the primary or the mother file set. It would be desirable to allow the trees to start separating with the respective data and metadata footprint and create chains of hierarchy in either limb to eventually form a tree of clones.

The challenge, however, lies in how the file system can manage its metadata efficiently while allowing sharing common data and supporting limb divergence.

In an embodiment, the technique for generating and handling a clone of a clustered file system applies to both the B+ Tree pages KVS table and Inode KVS table. The remainder of this disclosure focuses on the B+ Tree pages KVS table for concision.

In an embodiment, the KVS table is logically partitioned to enable scalability and parallel processing in a clustered system. Each such logical partition is identified by a unique value called "Routing Key." The NS or namespace manager, takes advantage of this and further partitions the table to represent each mtree. For each mtree, there are set of routing keys reserved. All the B+ Tree pages are written to one of those reserved routing keys specific to the mtree which the B+ Tree represents. In an embodiment, the routing key format is as shown below:

---
<mtree id>:<routing_key_suffix>
---

The routing key suffix is calculated based on the hash of the B+ Tree page number. In an embodiment, the value of the routing key suffix must be within the specified range, defined by "MAX_ROUTING_KEY_PER_MTREE."

The formula for calculating the routing key suffix is as shown below:

---
routing_key_suffix = hash(B+Tree page number)
---

Thus, the routing key includes a hash of the key itself which then identifies a bucket into which the key value should be placed.

In an embodiment, the routing key suffix must satisfy the following condition:

---
0 ≤ routing_key_suffix < MAX_ROUTING_KEY_PER_MTREE
---

The routing key is passed to kvs_get and kvs_put calls along with KVS key.

For the KVS Key for B+ Tree pages, each page in a B+ Tree is identified by a unique identifier referred to as a "Page Number." The page number is used as the key for the page in the KVS table.

In an embodiment, the filesystem uses a separate garbage collection (GC) module to clean up the data and metadata that are no longer referred to in the file system. For example, if an mtree is deleted, the corresponding B+ Tree pages in KVS is not deleted synchronously, instead they are deleted periodically using the garbage collection module.

In an embodiment, to achieve scalability in the clustered file system, the metadata cleaning is conducted for each mtree independently on different nodes in the cluster. To be more precise the cleaning is done per mtree per routing key. The GC module obtains the list of routing keys from the NS module and performs cleaning of dead KVS keys only for those set of routing keys.

In an embodiment, systems and techniques provide a method for instantaneously cloning an entire mtree, allowing the source and chain of cloned mtrees to diverge independently using a copy-on-write (COW) technique.

There are several aspects of the cloning problem including 1) an ability to read shared pages from parent mtree; 2) Copy-On-Write decision making; and 3) Protecting shared pages across mtree and clone chain.

Figure 11:
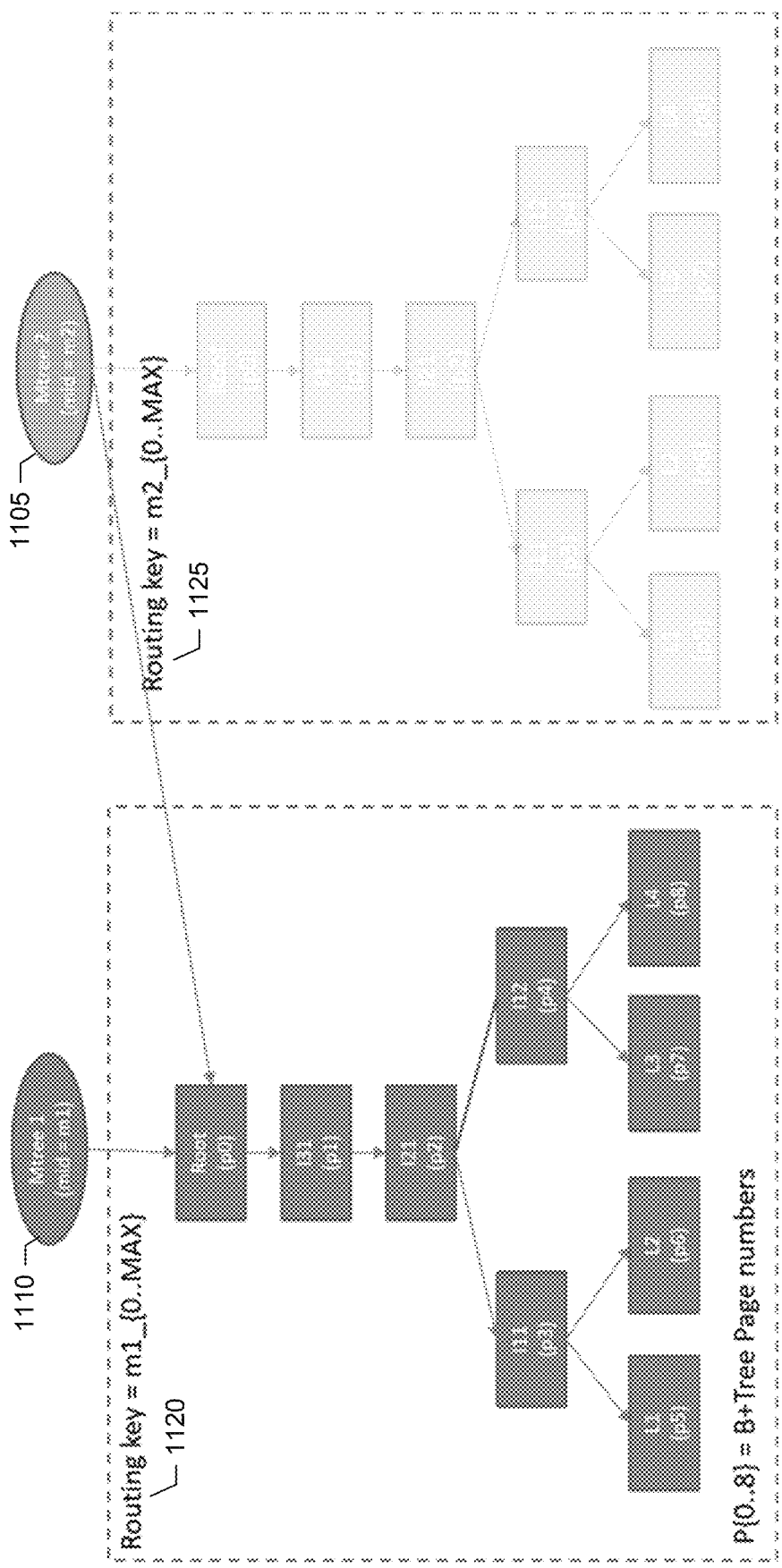
FIG. 11 shows an example of creating a clone, according to one or more embodiments.

FIG. 11 shows an example of a routing key operation when attempting to read shared pages from a parent mtree. In the example of FIG. 11, there is an mtree 1105 that was generated by cloning an mtree 1110. Mtree 1105 may be referred to as a child and is identified by an mtree id (mid) having a value of 2. Mtree 1110 may be referred to as a parent and is identified by an mtree id (mid) having a value of 1. B+ tree pages of the child mtree are shown in shadow to indicate that the pages are shared with the parent.

In an embodiment, the clone is implemented by taking the reference of the top-level data structure and performing COW when there is a change in any level in the file system metadata structures. In an embodiment, a clone can be generated by adding a reference to the parent mtree's root page. This achieves the clone of the mtree instantaneously.

However the challenge here is the way the routing keys are reserved for each mtree. When an mtree is cloned from another mtree, the cloned mtree becomes an independent mtree just like an mtree created afresh. In an embodiment, there are set of routing keys reserved for each mtree. This applies for cloned mtree as well. Thus, there are a set of routing keys 1120 for the parent and a set of routing keys 1125 for the child. Hence, even though the B+ Tree pages are shared, the read or write requests for clone mtree proceed with its own set of routing keys to KVS and KVS will not find any pages as these are new set of routing keys.

For example, FIG. 11 shows that "Mtree 2" (mid=m2) is cloned from "Mtree 1" (mid=m1) by just keeping the reference to the root page of the "Mtree1's B+ Tree." However when "Mtree 2" tries to read root page the read is done as follows (assume routing key for root page is calculated as m2_0).

---
kvs_get(routing_key = m2_0, page_num = 0)
---

This request fails as there are no pages written with routing key m2_0.

Another challenge with cloning a logical partition includes copy-on-write decision making. This, deciding if a page needs to be COWed when a write happens to shared page. In the example shown in FIG. 11, when a root page is updated for "Mtree 2," a COW operation should be triggered for B+ Tree page number 0. The same holds true for "Mtree 1" as well. That is, changes in "Mtree 1" should not modify a page referenced by any cloned mtrees. A COW has to happen both in a clone parent and clone child.

Another challenge includes protecting shared pages across a clone chain. As discussed, in an embodiment, the cleaning happens at an mtree level to achieve scaling and parallelism in the clustered filesystem. During the clean process, the GC module should ensure that the pages not referred by the mtree being cleaned but referred by any of the mtree from the clone chain should be protected. This is not possible if the GC module does not know anything about pages referred by other cloned mtrees.

Consider, as an example, the parent and child logical partitions (e.g., mtrees). Let us say that the mtree "Mtree 1" is deleted. When the GC module starts the cleaning process "Mtree 1", NS module provides routing keys for "Mtree 1" to the GC module and informs the GC module that "Mtree 1" does not need any pages for the set of routing keys provided. Hence, GC module proceeds to clean all the KVS keys for the routing keys provided for "Mtree 1." In this case, all the B+ Tree content for "Mtree 2" is lost.

Figure 12:
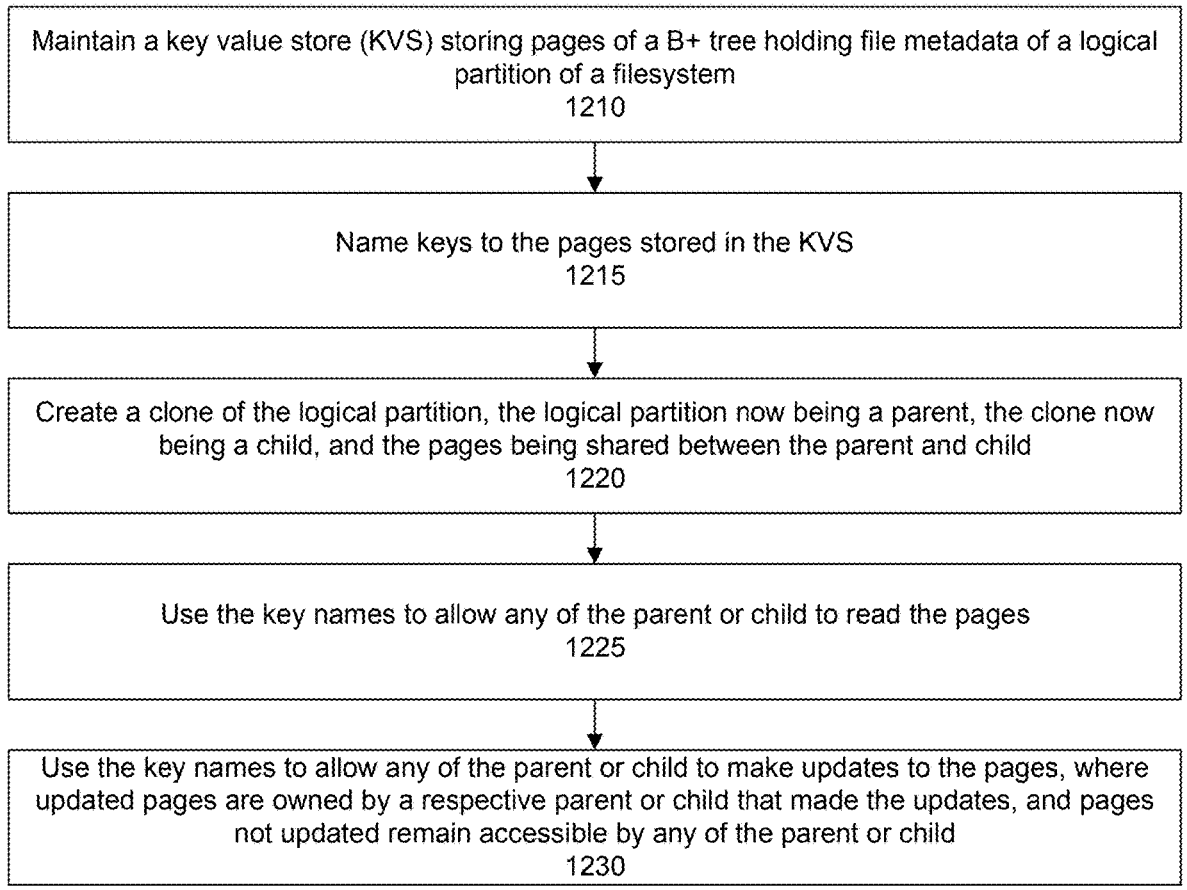
FIG. 12 shows an overall flow for cloning a logical partition, according to one or more embodiments.

FIG. 12 shows an overall flow for cloning a logical partition of a clustered filesystem and, more particularly, handling reads to shared pages, allowing for garbage collection, and allowing each logical partition—whether it is a clone parent or a clone child—to diverge as-needed. When one of a clone parent or a clone child diverges by the one of the parent or clone making an update to a page, the page becomes owned by the one of the parent or clone. The other of the parent or clone can continue to access a version of the page before the update.

Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 1210, a key value store (KVS) is maintained that stores pages of a B+ tree holding file metadata of a logical partition of a file system. In a step 1210, keys to the pages stored in the key value store are named. In a step 1215, a clone is created of the logical partition, the logical partition now being a parent, the clone now being a child, and the pages being shared between the parent and child. As discussed, the clone may be created by creating and maintaining a reference to a root page of the B+ Tree of the parent.

In a step 1220, the key names are used to allow any of the parent or child to read the (shared) pages. In a step 1225, the key names are used to allow any of the parent or child to make updates to the pages, where updated pages are owned by a respective parent or child that made the updates, and pages not updated remain shared and accessible by any of the parent or child.

In an embodiment, naming the keys to the B+ tree pages stored in the key value store includes forming the keys by inserting different types of identifiers into the keys. These identifiers that now form parts of the keys are examined and used to read shared pages, conduct garbage collection, and handle updates to the pages such as determining whether an update can be made to an existing page or whether a COW operation should be performed for the update.

More particularly, in an embodiment, systems and techniques provide a metadata group. In this embodiment, the metadata group is a logical grouping of a logical partition, e.g., mtree, and its clone chain. Each metadata group is identified by a unique identifier.

In this embodiment, when an mtree is created a new metadata group is assigned by default. When a clone is created from an mtree, the cloned mtree inherits the metadata group property from the parent. This ensures that the complete clone chain of mtrees are part of a single metadata group.

In this embodiment, handling reads to shared pages is accomplished by modifying the routing key formula as shown below.

---
<metadata_group_id>:<routing_key suffix>
---

There is no change in the way routing key suffix is calculated. This ensures that the chain of cloned mtrees share the common set of routing keys.

Thus, in this embodiment, the KVS read for both "Mtree 1" and "Mtree 2" use the same routing key for the B+ Tree pages. When either "Mtree 1" or "Mtree 2" tries to read a root page the read is performed as follows (assume routing key for root page is calculated as mg1_0):

---
kvs_get(routing_key = mg1_0, page_num = 0)
---

Figure 13:
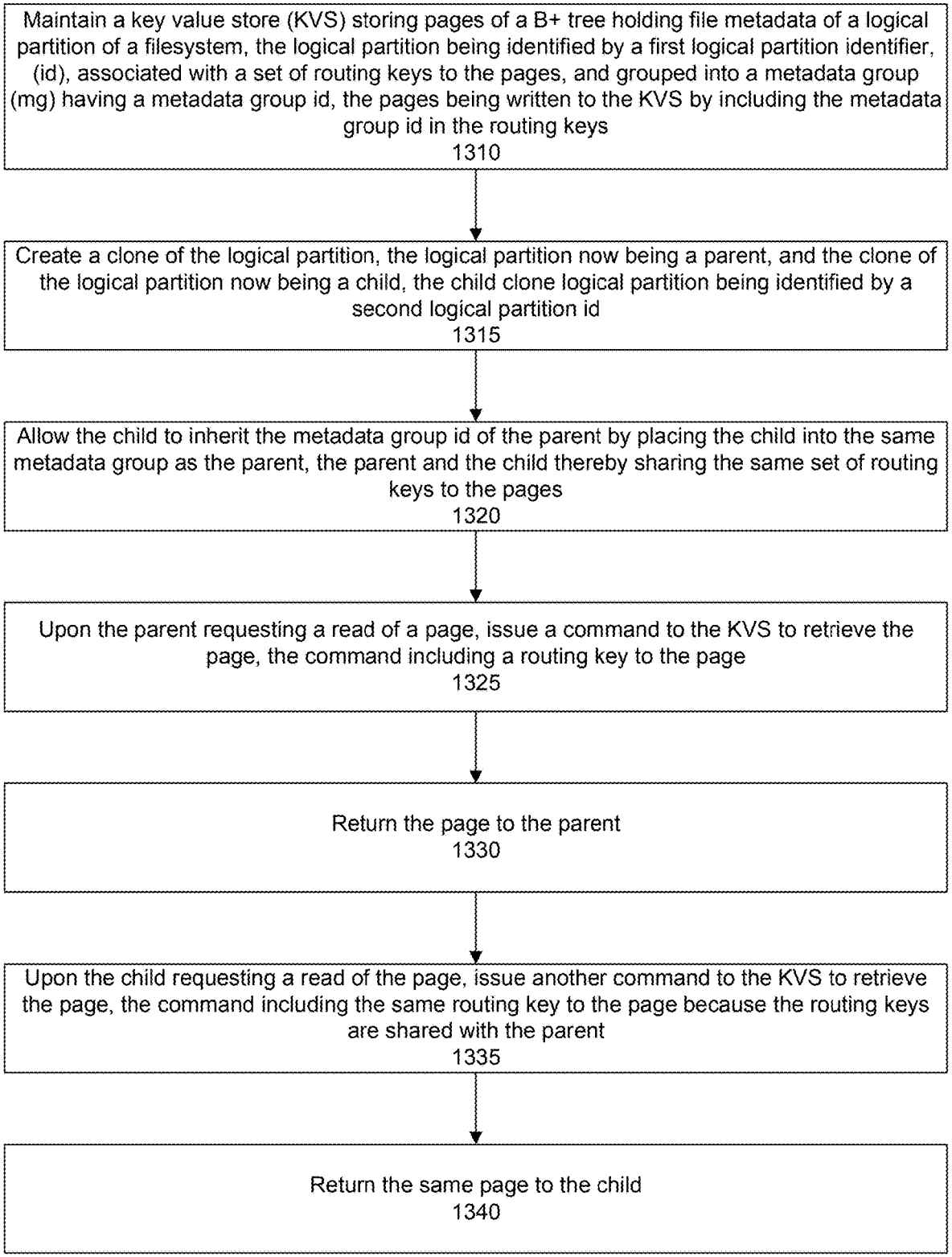
FIG. 13 shows a flow for a metadata group, according to one or more embodiments.

FIG. 13 shows a flow for the metadata group. In a step 1310, a key value store is maintained, the key value store storing pages of a B+ Tree holding file metadata of a logical partition of a file system. The logical partition is identified by a first logical partition identifier (id), associated with a set of routing keys to the pages, and grouped into a metadata group (mg) having a metadata group id. The pages are written to the KVS by including the metadata group in the routing keys.

In a step 1315, a clone of the logical partition is created, the logical partition now being a parent, and the clone of the logical partition now being a child. The child clone logical partition is identified by a second logical partition id, different from the first logical partition id.

In a step 1320, the child inherits the metadata group id of the parent by being placed in the same metadata group as the parent, the parent and the child thereby sharing the same set of routing keys to the pages.

In a step 1325, upon the parent requesting a read of a page, a command is issued to the key value store to retrieve the page, the command including a routing key to the page. In a step 1330, the page is returned to the parent.

In a step 1330, upon the child requesting a read of the page, another command is issued to the key value store to retrieve the page. The command includes the same routing key to the page because the routing keys are shared with the parent.

In a step 1335, the same page is returned to the child.

Figure 14:
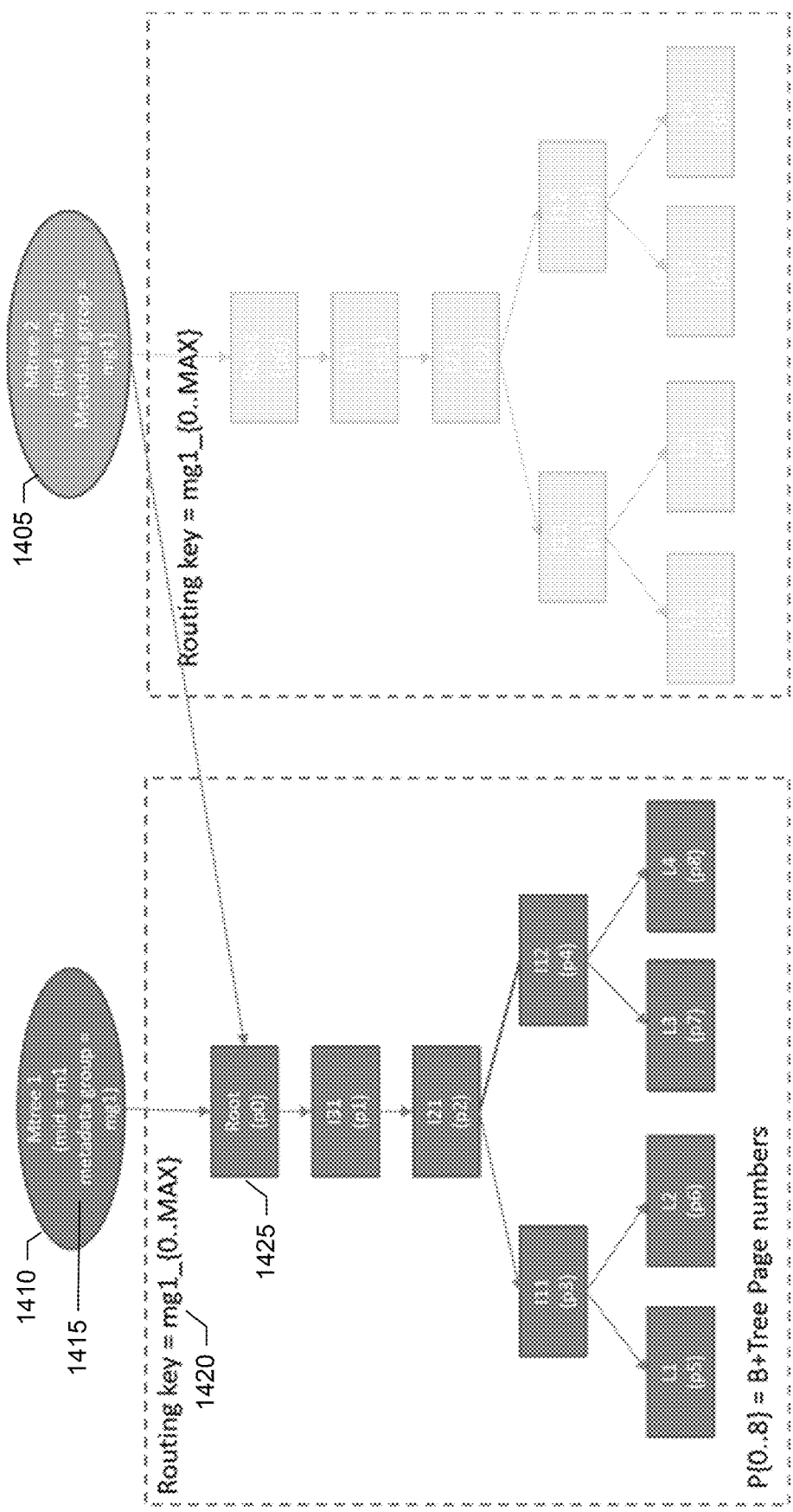
FIG. 14 shows an example of the metadata group with a clone, according to one or more embodiments.

FIG. 14 shows an example of a routing key operation when attempting to read shared pages using a metadata group. The example shown in FIG. 11 is similar to the example shown in FIG. 11. For example, there is a logical partition or mtree 1405 that was generated by cloning an mtree 1410. Mtree 1405 may be referred to as a child and is identified by an mtree id (mid) having a value of 2. Mtree 1410 may be referred to as a parent and is identified by an mtree id (mid) having a value of 1. B+ tree pages of the child mtree are shown in shadow to indicate that the pages are shared with the parent.

In the example of FIG. 14, however, the parent mtree is shown as belonging to a metadata group (mg) 1415 having a metadata group identifier of 1. The child mtree has inherited the metadata group id of the parent. That is, the child also has a metadata group identifier of 1. Further, routing keys 1420 are named with the metadata group identifier. Since the child is placed into the same metadata group as the parent, the routing keys are shared between the parent and child.

Consider, as an example, that the parent wishes to read a root page 1425 (e.g., step 1325, FIG. 13). The root page has a page number of 0, e.g., p0. In this embodiment, the routing key includes the form:

$$\text{<metadata\_group\_id>:<routing\_key\_suffix>}$$

So, the following command is issued to the key value store:

$$\text{kvs\_get(routing\_key=mg1, page\_num=0)}$$

That is, the command includes a routing key where the routing key includes a metadata group identifier of a metadata group in which the parent resides (e.g., metadata group 1) and a page number of a page to retrieve. Thus, page 1425 is returned.

Consider that the child wishes to read the root page (e.g., step 1335, FIG. 13). Again, the following command is issued to the key value store:

$$\text{kvs\_get(routing\_key=mg1, page\_num=0)}$$

That is, the command includes a routing key where the routing key includes a metadata group identifier of a metadata group in which the child resides (e.g., metadata group 1) and a page number of a page to retrieve. Thus, the same page 1425 is returned. In this embodiment, the metadata group id, rather than the individual mtree id, forms the routing key prefix. An entire clone chain (e.g., a parent and any number of descents) are grouped to belong to a same metadata group. The metadata group id forms part of the routing key (e.g., routing key prefix) for all the B+ Tree pages in the metadata group.

Figure 15:
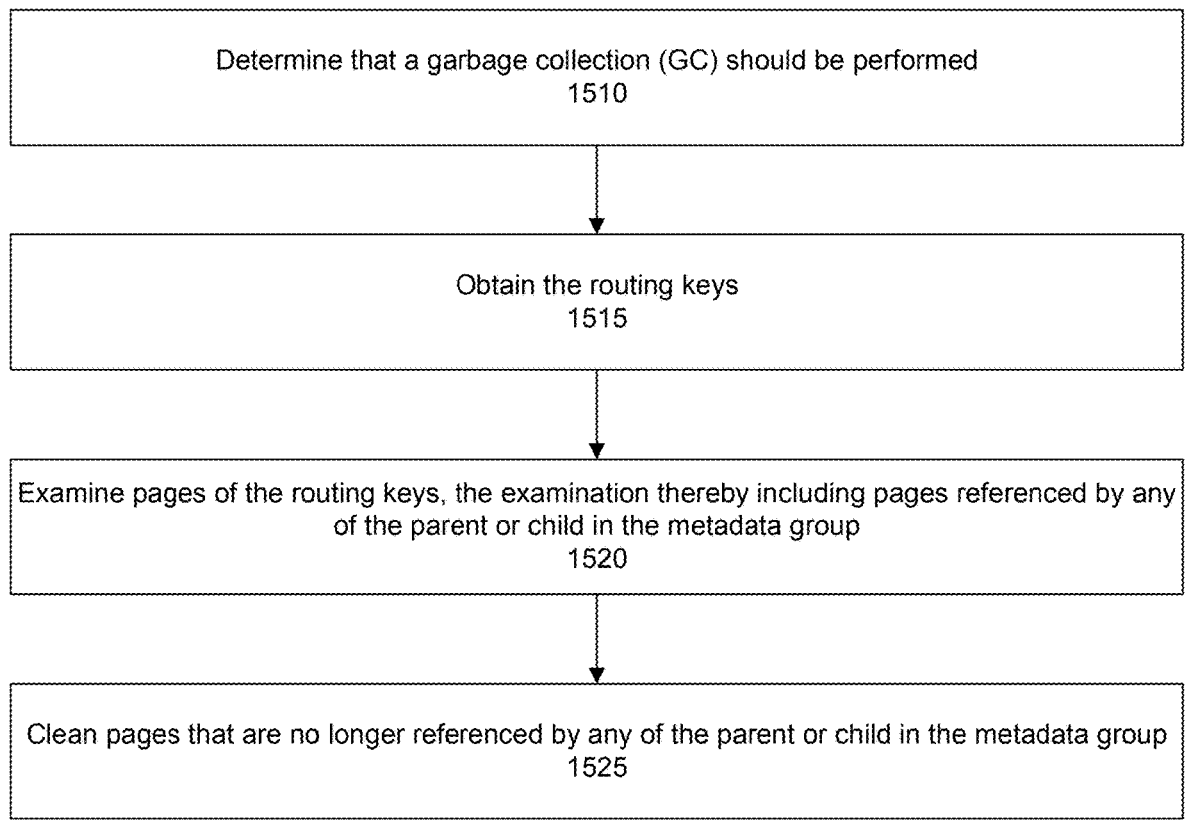
FIG. 15 shows a flow for garbage collection, according to one or more embodiments.

In an embodiment, the metadata group is also applied to garbage collection by changing the unit of cleaning from the logical partition (or mtree) level to the metadata group level. For example, FIG. 15 shows a flow for garbage collection using the metadata grouping technique. In a step 1510, a determination is made that garbage collection should be performed. Garbage collection is a process that reclaims storage space by identifying and removing data, metadata, or both that is no longer needed. Garbage collection may be triggered based on any number of factors. For example, garbage collection may be triggered based on space utilization such as when storage utilization reaches a certain threshold (e.g., 80 percent of capacity). As another example, garbage collection may be triggered using time-based policies that are designed to trigger the process during periods of low expected activity, e.g., nightly at 11:00 PM.

In a step 1515, routing keys for a metadata group are obtained.

In a step 1520, pages of the routing keys are examined. The examination includes pages referenced by any of the parent or child in the metadata group as the parent and child belong to the same metadata group.

In a step 1525, pages that are no longer referenced by any of the parent or child in the metadata group are cleaned, e.g., removed or deleted.

Figure 16:
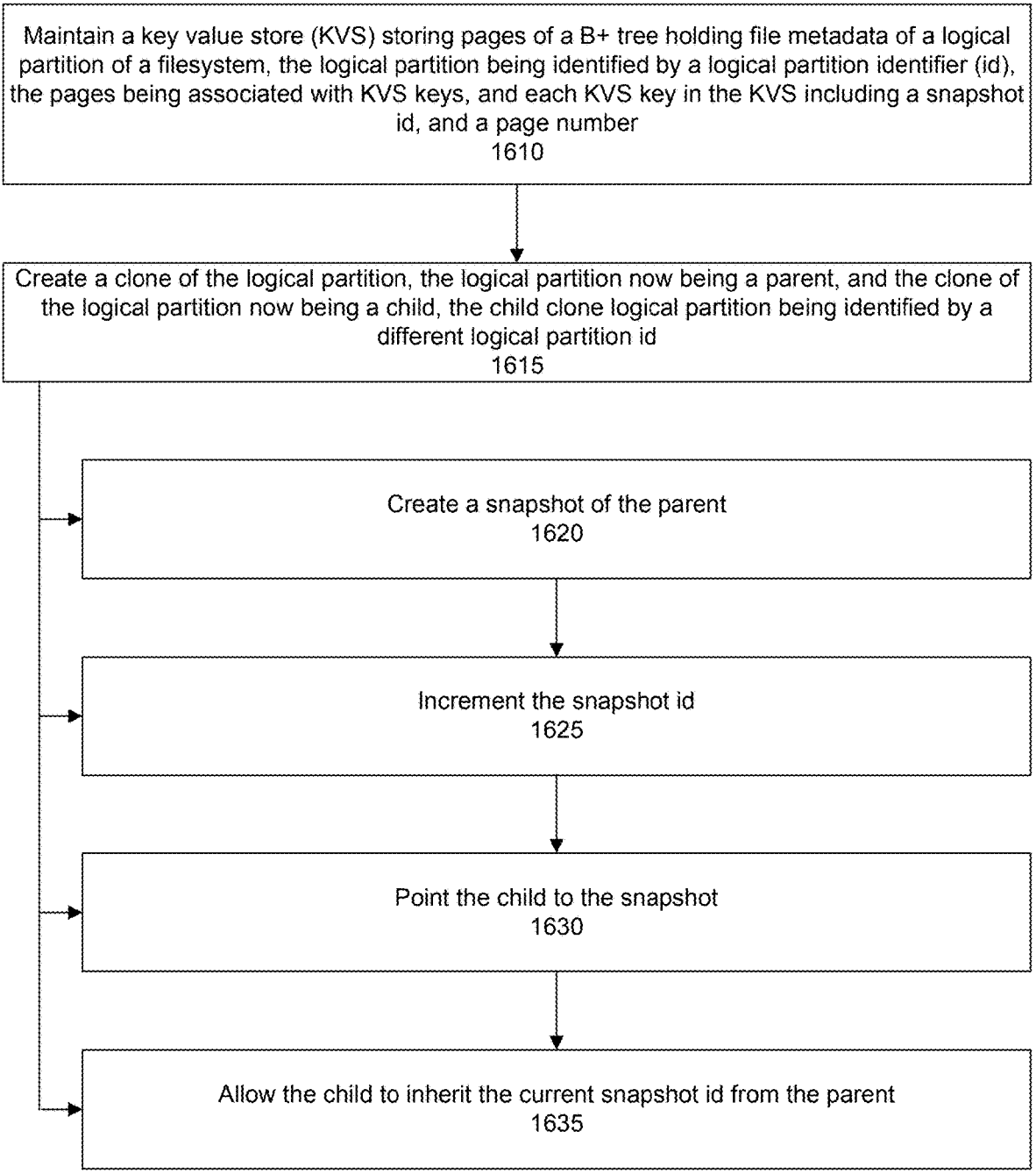
FIG. 16 shows a flow for handling a copy-on-write at a clone parent, according to one or more embodiments.

FIG. 16 shows a flow for handling a copy-on-write (COW) at a clone parent and clone child, respectively. There are two parts to the COW depending on whether the update is at the parent or child. The COW operation helps to ensure that an update by one of a parent or child to a page shared between the parent and child is then owned by the one of the parent or child, while the other of the parent or child can still access a version of the page before the update. In an embodiment, the COW operation involves making a copy of the page, writing the update to the page copy, and adding a new key to the key value store for the updated page.

In an embodiment, to achieve COW at a clone parent, a snapshot of the mtree B+ Tree is taken to create a clone. Each snapshot includes a unique snapshot id. In an embodiment, the snapshot id is a monotonously increasing number.

The snapshot id is made as part of the KVS key. This helps to decide if a page needs to go through COW. B+ Tree page key in KVS may be formed as follows:

$$\text{<snapshot\_id>:}$$

The page key is named with or includes the snapshot id.

Consider, as an example, that the current snapshot id (which may be referred to as an active mtree) is 1. Then all the B+ Tree pages for the active mtree in the key value store are written with "1:<page_number>." The term "active" may be used to identify that particular mtree or logical partition that is exposed to traffic and receive writes.

Now, when a clone is created, at first a snapshot is created. The creation of the snapshot increments the current snapshot id to 2. The cloned mtree is made to point to the snapshot. Note that the cloned mtree also inherits the current snapshot id from its parent. In this case it is "2."

When there is an update to a page in the parent mtree, the parent compares the snapshot id of the page key with the current snapshot id. When the snapshot id from the page key is less than (or different from), the current snapshot id, it then performs COW for such page.

In another embodiment, the snapshot id is decremented. It should be appreciated that any algorithm having any mathematical operation or combinations of operations may be used to uniquely identify a snapshot and time the snapshot was taken relative to another snapshot.

Referring now to FIG. 16, in a step 1610, a key value store is maintained in which the key value store stores pages of a B+ Tree holding file metadata of a logical partition (e.g., mtree) of a file system. The logical partition is identified by a logical partition identifier, and the pages are associated with KVS keys. Each KVS key in the key value store includes a snapshot id and a page number.

Figure 17:
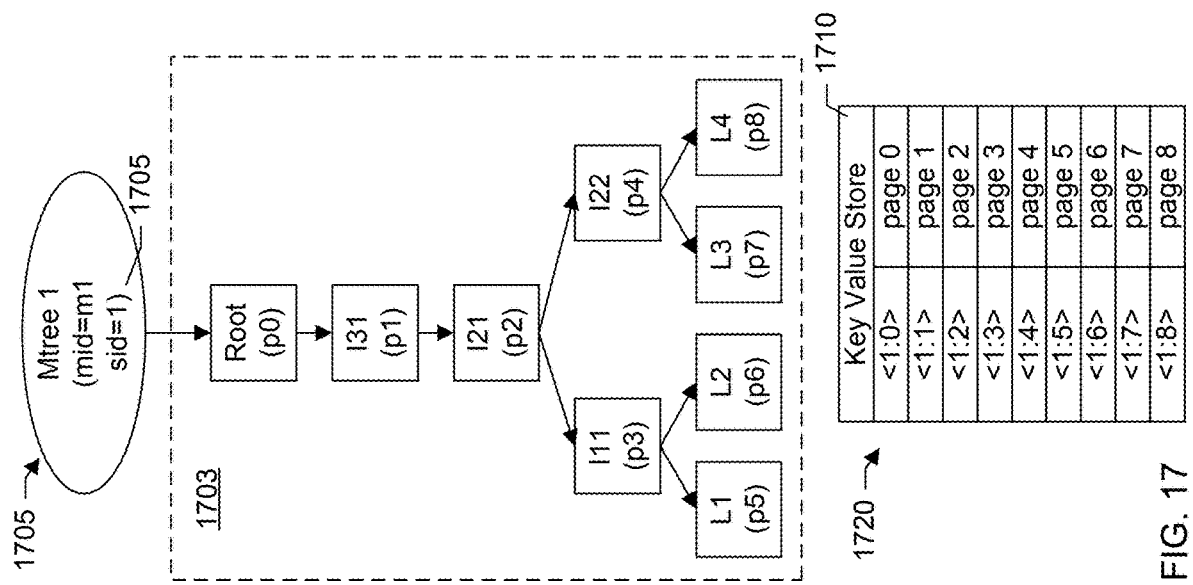
FIG. 17 shows a state of the file system at an initial time, according to one or more embodiments.

FIG. 17 shows a current state of the file system at a first or initial time. As shown in the example of FIG. 17, there is a B+ tree 1703 for a logical partition 1705 and a key value store 1710 storing pages of the B+ Tree. The logical partition is identified as Mtree 1. Mtree 1 may be referred to as an active Mtree. A snapshot id 1715 currently has a value of 1, e.g., sid=1. Thus, KVS keys 1720 in the key value store to the pages have been written with a form including "<snapshot_id>:<page_number>" or, more particularly, "<1>:page_number>."

Referring back now to FIG. 16, in a step 1615, a clone of the logical partition is created, the logical partition now being a parent, and the clone of the logical partition now being a child, the child clone logical partition being identified by a different logical partition identifier.

Creating the clone triggers a series of actions or events. Specifically, a snapshot is taken of the parent (step 1620). The current snapshot identifier is incremented (step 1625). The child clone is pointed to the snapshot (step 1630). The child clone inherits the now incremented current snapshot identifier from the parent (step 1635).

Figure 18:
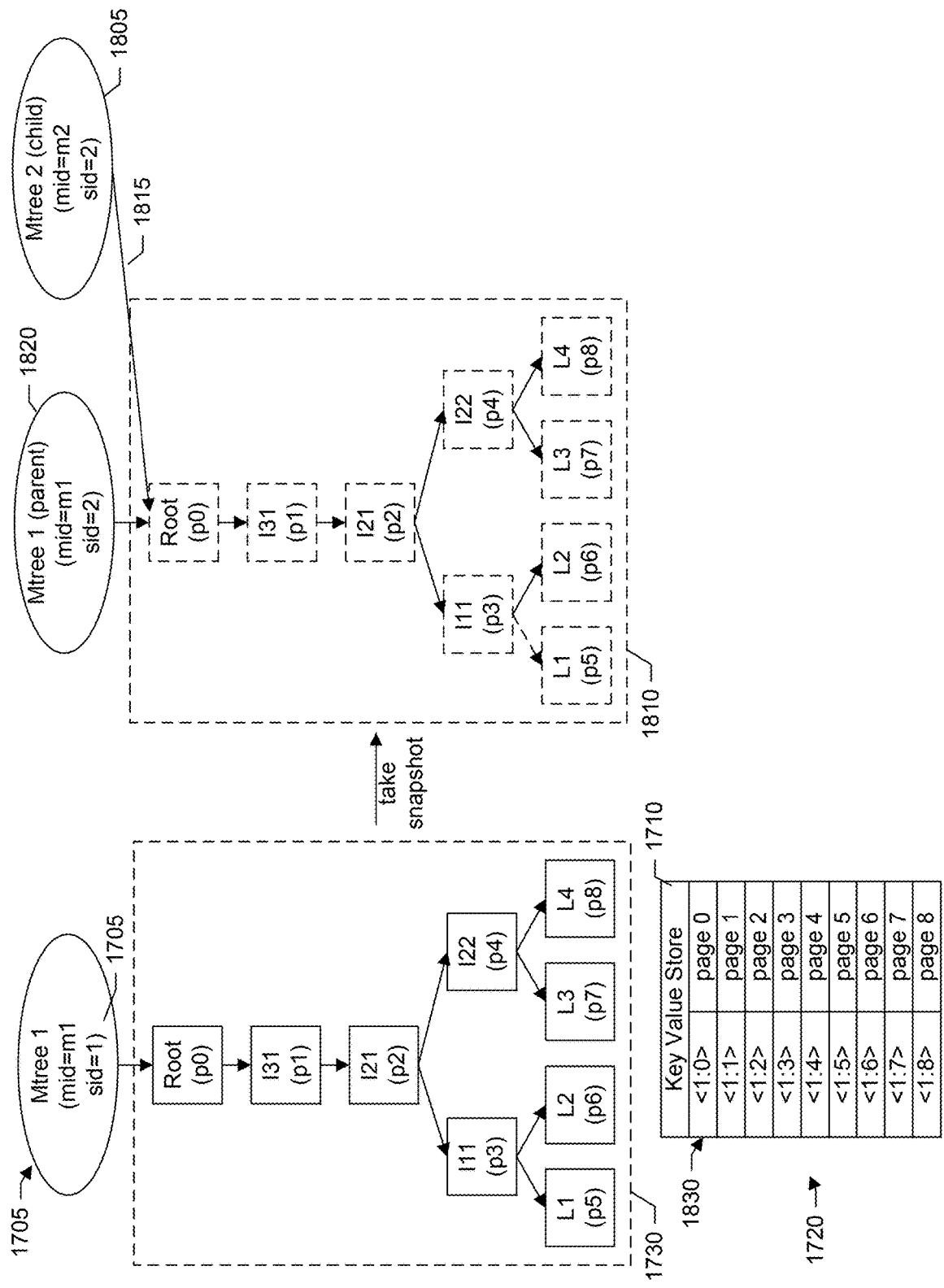
FIG. 18 shows a state of the file system after a clone has been made, according to one or more embodiments.

FIG. 18 shows a state of the file system at a second time after a clone child 1805 has been made. A snapshot 1810 is taken of logical partition Mtree 1 (step 1620, FIG. 16). B+ tree pages shown in broken lines indicate the snapshot of the pages. The current snapshot identifier is incremented, (e.g., current sid=previous sid+increment value=1+1=2) (step 1625). The clone child is pointed 1815 to the snapshot (step 1630). The child clone inherits the current snapshot identifier, now sid=2, from the parent (step 1635).

Figures 19, 20:
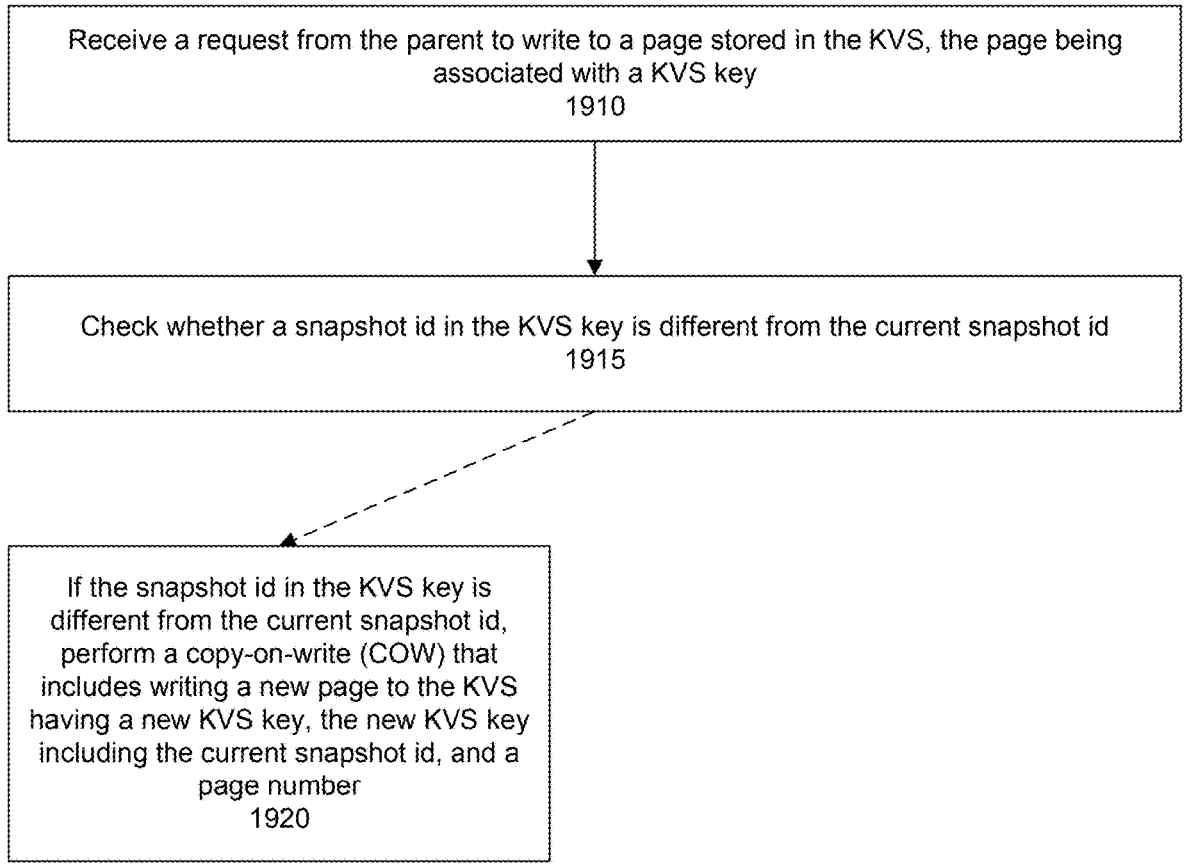
FIG. 19 shows a flow for handling updates to a page shared between the parent and child at the parent, according to one or more embodiments.
FIG. 20 shows a state of the file system after a copy-on-write operation, according to one or more embodiments.

FIG. 19 shows a flow for handling updates to pages shared between the parent and child at the parent. In a step 1910, a request is received or intercepted from the parent to update or write to a page of the B+ tree stored in the key value store, the page being associated with a KVS key. In a step 1915, a check or comparison is made as to whether a snapshot identifier in the KVS key is different from the current snapshot identifier. In an embodiment, the comparison includes determining whether the snapshot identifier in the KVS key is less than the current snapshot identifier.

In a step 1920, if the snapshot identifier in the KVS key is different from (or less than) the current snapshot identifier, a copy-on-write is performed. The copy-on-write includes writing a new page to the key value store having a new KVS key that includes the current snapshot identifier and page number.

Referring back now to FIG. 18, the key value store continues to store KVS keys 1720 and corresponding pages. Consider, as an example, the request from the parent is to update page 0. The request includes a KVS key having a form that includes a snapshot identifier and page number, e.g., <1:0>. Thus, the KVS key identifies or maps to an existing entry 1830 in the key value store.

A check is made as to whether the snapshot identifier in the KVS key (e.g., sid=1) is different from the current snapshot identifier (e.g., sid=2) (step 1915, FIG. 19). In this example, the snapshot identifier in the KVS key is different from the current snapshot identifier so a copy-on-write is performed for the update. The copy-on-write includes writing a new page to the key value store having a new KVS key that includes the current snapshot identifier and page number (step 1920, FIG. 19).

FIG. 20 shows a state of the key value store after the copy-on-write operation. A new entry 2010 has been added to the key value store that includes a new KVS key to a new page 0. The new KVS key includes the current snapshot identifier, e.g., sid=2, and page number, e.g., 0. Existing entry 1830 remains unchanged, thus allowing the child to continue accessing the original version of the page before the update by the parent.

To handle copy-on-write decision making at the clone child, however, the introduction of snapshot id alone does not help with deciding COW for a clone child. Consider that a page with a snapshot id 5 and a page number 10 (kvs key=5:10) is shared by a clone parent and its child mtree.

Let's assume the current snapshot id is 6 in both clone parent and child. When the clone child mtree makes a change in page 10, as per the snapshot id comparison, it writes page 10 with snapshot id 6 (KVS Key=6:10). Later, if the clone parent makes a change in its own page 10, it also calculates the KVS key as 6:10, leading to an overwrite of the page written by clone child mtree.

To overcome this problem, in an embodiment, the mtree id is introduced in the KVS key for B+ Tree pages. The new KVS Key format may be as follows:

<mtree_id>:<snapshot_id>:<page_number>

With this change in key format, a COW decision is made on both the mtree id and snapshot id. When either of these two are different from a current mtree id or current snapshot id, COW is performed.

Figure 21:
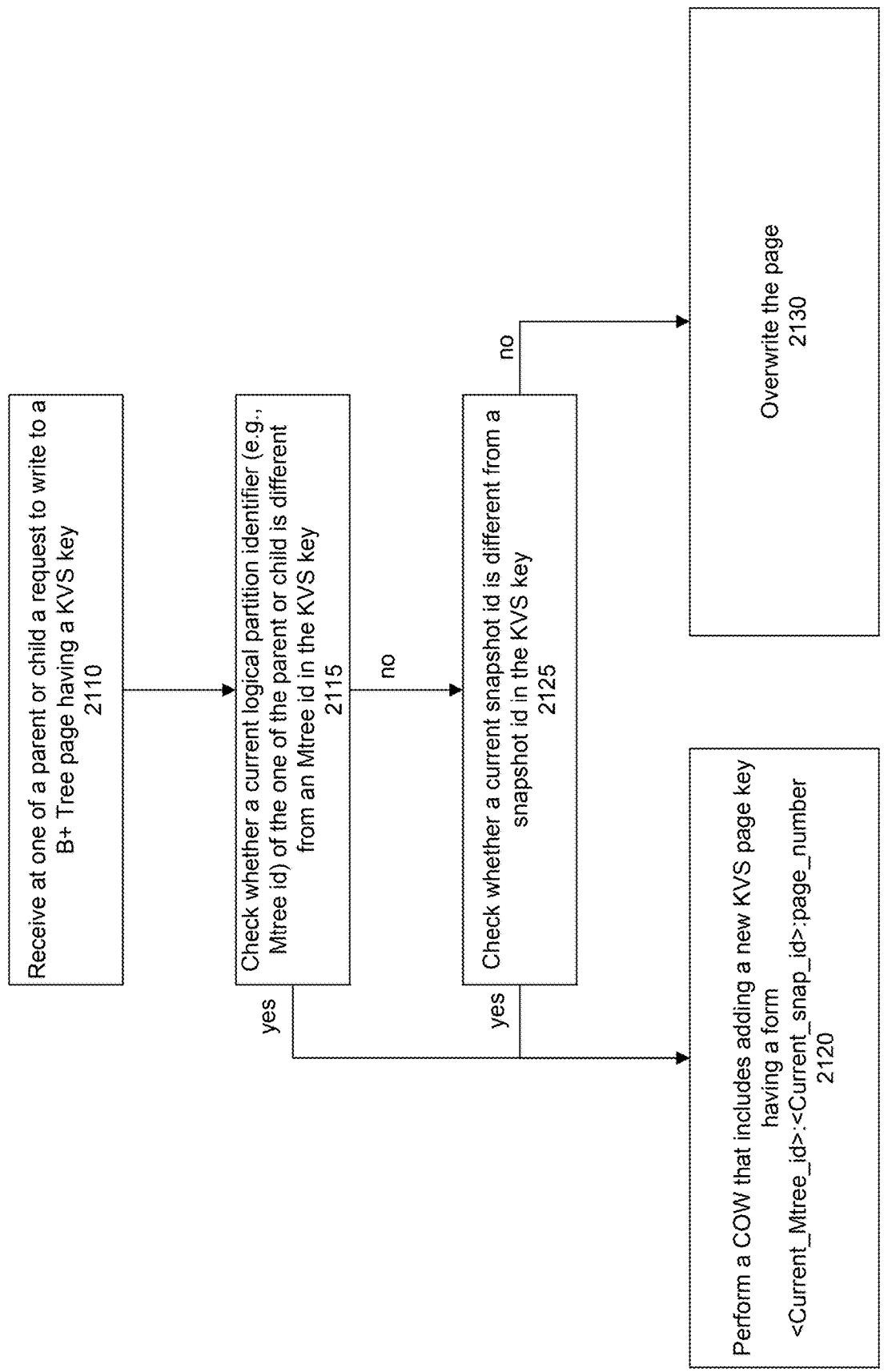
FIG. 21 shows a flow for handling copy-on-write decision making in both a parent and child, according to one or more embodiments.

FIG. 21 shows a flow for handling copy-on-write decision making in both a clone parent and clone child. In a step 2110, a request is received at one of a parent or child to write to a B+ Tree page. The request includes a KVS key to the page.

In a step 2115, a check is made as to whether a logical partition identifier (Mtree id) of the one of the parent or child different from a logical partition identifier (Mtree id) in the KVS key. The logical partition identifier (Mtree) id of the one of the parent or child may be referred to as a current logical partition identifier (Mtree).

If the Mtree identifiers are different, in a step 2120, a copy-on-write is performed that includes adding a new KVS page key (and corresponding page) to the key value store having a form <Current_Mtree_id>:<Current_snap_id>: page_number.

If the Mtree identifiers are not different, e.g., are the same, in a step 2125, a check is made as to whether a current snapshot identifier is different from a snapshot identifier in the KVS key.

If the snapshot identifiers are different, the COW is performed (step 2120). Alternatively, if the snapshot identifiers are the same, the page is overwritten (step 2130).

FIG. 22 shows a current state of a key value store 2205 after a clone child has been made. As shown in FIG. 16 and described in the discussion accompanying FIG. 16, the creation of the clone triggers creating a snapshot of the parent, incrementing the snapshot identifier (e.g., incrementing a snapshot identifier (sid) from a value of 1 to a value of 2), pointing the child to the snapshot, and allowing the child to inherit the current snapshot identifier (e.g., sid=2) from the parent.

The key value store shown in FIG. 22 is similar to the key value store shown in FIG. 18. In the key value store of FIG. 22, however, the logical partition identifier (Mtree id) has been included as a part of the KVS key. As previously discussed, the pages are shared between the parent clone and child clone via the shared routing keys. Thus, the parent clone (having mtree id 1) may access pages 0-8 having KVS keys <1:1:0>-<1:1:8>, respectively. Similarly, the child clone (having mtree id 2) may access the same pages, e.g., pages 0-8 having KVS keys <1:1:0>-<1:1:8>, respectively.

Consider, as an example, that the parent (having mtree id 1) issues a request to update page 0. Accompanying the request is a KVS key having the form <1:1:0>. Thus, Mtree identifier is 1, the snapshot identifier is 1, and the page number is 0. The KVS key thus identifies entry 2220 in the key value store having page 0.

A check is made as to whether the current Mtree id (which in this example is the parent mtree having mtree id 1) is different from the Mtree id in the KVS key (step 2115, FIG. 21). The current Mtree id 1 is not different from the Mtree id 1 in the KVS key.

So, the process moves to checking whether current snapshot id is different from a snapshot id in the KVS key (step 2125, FIG. 21). In this example, the current snapshot id has a value of 2 and the snapshot id in the KVS key has a value of 1. Since the snapshot identifiers are different, a COW operation is performed (step 2120).

FIG. 23 shows a state of the key value store after the COW operation. The COW operation results in an entry 2310 to the key value store for the write. The entry includes a KVS key having the current Mtree id of 1 for the parent, current snapshot id of 2, and page number 0. Entry 2220 having KVS key <1:1:0> for page 0 remains unchanged thereby allowing the child to continue accessing an original or previous version of the page.

Consider, as a further example, that the parent (having mtree id 1) issues another request to update new page 0. Accompanying the request is a KVS key having the form <1:2:0>.

A check is made as to whether the current Mtree id (which in this example is the parent mtree having mtree id 1) is different from the Mtree id in the KVS key (step 2115, FIG. 21). The current Mtree id 1 is not different from the Mtree id 1 in the KVS key.

So, the process moves to checking whether the current snapshot id is different from a snapshot id in the KVS key (step 2125, FIG. 21). In this example, the current snapshot id has a value of 2 and the snapshot id in the KVS key has a value of 2. Since the snapshot identifiers are not different, the page is overwritten (step 2130).

FIG. 24 shows a state of the key value store after the page is overwritten. As shown in the example of FIG. 24, a payload for entry 2310 corresponding to existing KVS key <1:2:0> has been overwritten 2410.

Entry 2220 having KVS key <1:1:0> for page 0 remains unchanged thereby allowing the child to continue accessing an original or previous version of the page.

Consider, as a further example, that the child (having mtree id 2) issues a request to update page 1. The current mtree id is thus 2. Accompanying the request is a KVS key having the form <1:1:1>, e.g., Mtree id is 1, snapshot id is 1, and page number is 1.

A check is made as to whether the current Mtree id (which in this example is the child mtree having mtree id 2) is different from the Mtree id in the KVS key (step 2115, FIG. 21). The current Mtree id 2 is different from the Mtree id 1 in the KVS key.

Thus, the COW operation is performed (step 2120, FIG. 21).

FIG. 25 shows a current state of the key value store after the COW operation. The COW operation results in an entry 2510 to the key value store for the write. The entry includes a KVS key having the form <2:2:1>. That is, the current Mtree id of 2 for the child, current snapshot id of 2, and page number 1. Page 1 corresponding to KVS key <1:1:1> remains unchanged thereby allowing the parent to continue accessing a previous version of the page before the update from the child.

Consider, as a further example, that the parent (having mtree id 1) issues a request to update page 1. Accompanying the request is a KVS key having the form <1:1:1>.

A check is made as to whether the current Mtree id (which in this example is the parent mtree having mtree id 1) is different from the Mtree id in the KVS key (step 2115, FIG. 21). The current Mtree id 1 is not different from the Mtree id 1 in the KVS key.

So, the process moves to checking whether the current snapshot id is different from a snapshot id in the KVS key (step 2125, FIG. 21). In this example, the current snapshot id has a value of 2 and the snapshot id in the KVS key has a value of 1. Since the snapshot identifiers are different, the COW operation is performed (step 2120).

FIG. 26 shows a state of the key value store after the COW operation. The COW operation results in an entry 2610 to the key value store for the write. The entry includes a KVS key having the form <1:2:1>, e.g., current Mtree id of 1 for the parent, current snapshot id of 2, and page number 1. Entry 2510 for new page 1 corresponding to KVS key <2:2:1> and containing the write by the child remains unchanged thereby allowing the child to continuing accessing the version of the page as updated by the child and without the update from the parent.

The described systems and techniques can apply to both a cluster file system and single node file system as the design operates on the logical constructs of the key value store which can be distributed or local. The solution itself does not make any assumption or dependency about whether the file system is clustered or local.

The following are some benefits of the cloning technique.
  1) Near zero space overhead for creating the clone. The overhead for the space reclamation and space consumption is proportional only to the amount of change that happens in the clone, it does not add any additional overhead.

2) No elaborate and/or separate change block map keeping, and maintenance is required as the natural structure of B+ Tree based Mtrees automatically covers the needs of the same.

3) Once an mtree is cloned, it behaves like an independent full-blown mtree without any impact on the parent mtree during IO and space reclamation. All the features available for regular mtrees (like disaster recover (DR)) are readily available for cloned mtrees.

Figure 27:
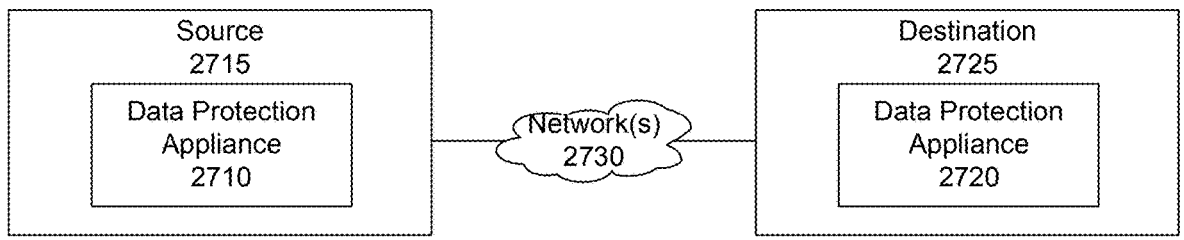
FIG. 27 shows a block diagram in which changes made at a source data protection appliance are replicated to a destination data protection appliance, according to one or more embodiments.

FIG. 27 shows a block diagram in which changes made at a data protection appliance 2710 at a source site 2715 are replicated, e.g., copied, to a data protection appliance 2720 at a destination site 2725. In an embodiment, the source and destination sites are remote from each other and connected by a network 2730 such as a wide area network. For example, the source data protection appliance may reside within a data center in Round Rock, Texas, while the destination appliance resides in a data center in Las Vegas, Nevada. Alternatively, the source and destination appliance may be located on the same local area network. The destination may be referred to as a target.

Replicating backups of file sets provide for disaster recovery (DR) capabilities and protect against catastrophic events like hurricanes and floods or man-made disasters like chemical spills and malicious attacks. There is a need to improve upon traditional replication and moving backups and data due to the volume of data backed up and archived every day. Deduplicated replication can significantly reduce the network bandwidth required by sending only unique data over the network. Time-to-DR is critical. While backup and archive applications may not require the synchronous behavior of transaction replication, there still remains a need to ensure data consistency at the replica, and fast restore streams and recovery from the replica as quickly as possible after data is initially stored on the source system.

Figure 28:
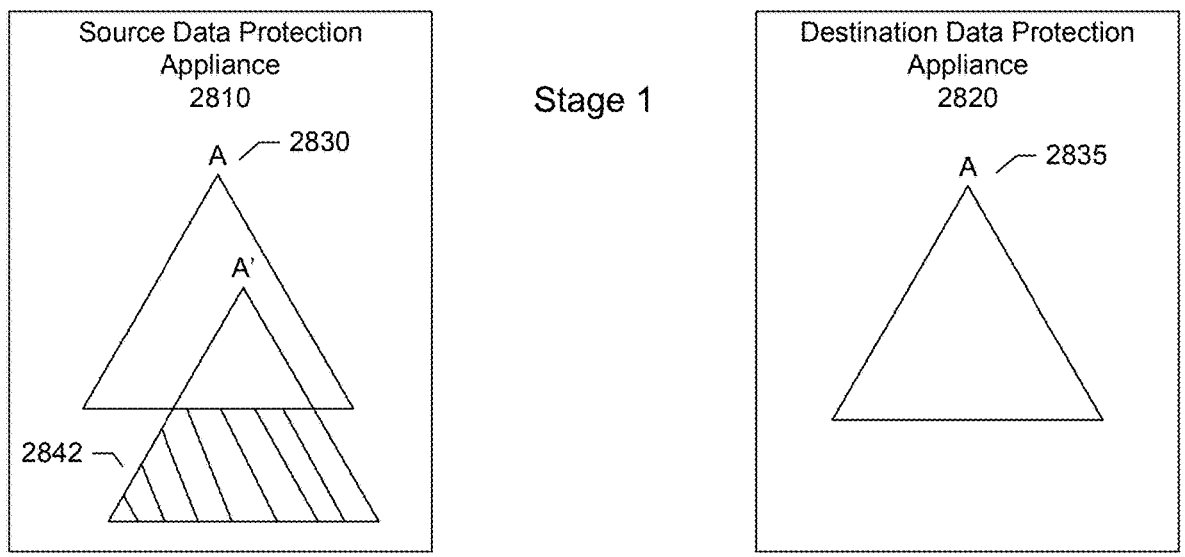
FIG. 28 shows a block diagram of an initial state of replication from a source to a destination, according to one or more embodiments.

FIG. 28 shows a block diagram of a beginning state (e.g., stage 1) of a replication cycle during which incremental changes made at a source data protection appliance 2810 since a last replication cycle are to be transmitted to a destination data protection appliance 2820. The source includes an mtree A 2830. The destination includes a replicated copy 2835 of source mtree from the last replication cycle. The previously replicated copy may be referred to as a base image. In an embodiment, the source data protection appliance provides a target destination for any number of backup clients. In a production environment, the source data protection appliance continuously accepts files for ingest and changes to the files occur over time.

In order to capture the changes to the files and strike a balance between providing good performance for production ingest and data protection from disasters, replicating an mtree or file set from the source to destination may be configured to occur at periodic intervals (e.g., every 15 or 20 minutes, or any other interval of time as desired). An mtree A' represents a latest or current version of the mtree. In an embodiment, a replication cycle is initiated by taking a snapshot of mtree A' at the source at the configured replication interval. The snapshot is compared against the base image previously sent to the destination in a last replication cycle to identify differences 2842 including metadata changes since the last replication cycle. The metadata changes can be used to determine any file content that may have changed since the last replication cycle (e.g., over the last 15 minute replication interval).

In an embodiment, the triangles (e.g., 2830 and 2835, FIG. 28) represent one or more files or a set of files that may be referred to as file sets or mtrees. These mtrees can represent metadata (primarily) and data (secondarily). A file system can contain multiple file sets (or mtrees). In an embodiment, the file system supports 256 mtrees as a maximum depending on hardware configuration of the underlying platform.

In an embodiment, each file set is independent at least as far as the metadata is concerned. There is no metadata sharing between file sets, though it is possible but usually may not be a lot, that data of files of one mtree may share/dedup with that of other mtrees.

Figure 29:
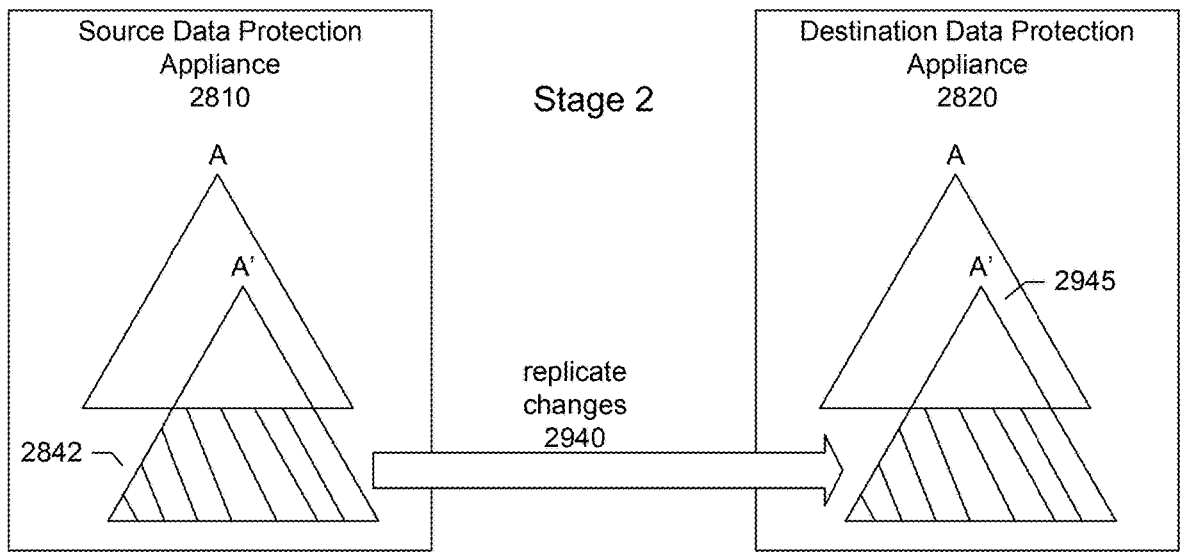
FIG. 29 shows a block diagram of a subsequent or next state of replication from the source to the destination in which a snapshot-based mechanism is used, according to one or more embodiments.

FIG. 29 shows a next state (e.g., stage 2) of the replication cycle. The changes or, more particularly, incremental changes 2842, at the source are retrieved and replicated 2940 to the destination. Once the incremental changes land at the destination, the changes are applied to the base from the last replication cycle to reconstruct a snapshot of mtree A' 2945 at the destination. Mtree A' at the destination is shown within Mtree or main file set A to indicate that while the snapshot is being reconstructed, mtree A' is not exposed directly to the clients. That is, mtree A' is not available for redirect access while it is in a semi-complete state. In an embodiment, client applications are not able to read mtree A' as it is gradually reconstructed until after all incremental changes have arrived at the destination and the reconstruction of the snapshot is complete.

In other words, in this embodiment, at a periodic interval a replication mechanism takes the snapshot of the source file set, and diffs such new snapshot with an earlier snapshot that was already shipped in an earlier cycle to the destination. The changes between the two snapshots contain metadata updates like file creations, deletions, and modifications as well as the corresponding data. Until all the differences between the two snapshots, both data as well as metadata reach destination, only the earlier shipped point in time image (aka snapshot) of the source is visible for use on the destination. And the metadata changes are shipped key-by-key (of the BTree of the Mtree) changes to construct the incremental Btree at the destination. This is shown in stage 1 and stage 2 of FIGS. 28 and 29, respectively. Stage 1 (FIG. 28) is the initial stage and stage 2 (FIG. 29) shows the incremental. In such a snapshot mechanism, the snapshot is sheltered inside the source Mtree (FIG. 28—stage 1) as well as the destination Mtree (FIG. 29—stage 2). In this embodiment, mtree A' is not available on destination unless and until all the metadata and data differences of A and A' of the source reach the destination.

The technique shown in FIG. 29 involves using snapshot-based replication at the source and destination. On the source, a snapshot is taken of the mtree, and then a 'diffing' operation is performed. The 'diffing' operation includes walking the B+ tree to find keys that were added, deleted or modified when compared with its earlier snapshot. Once that is done, the source starts sending the changes in the B+ tree if only metadata like any access controls or file attributes have changed since the last replication cycle (i.e., last snapshot to the current snapshot). But if any file content is also changed, then the data changes are also shipped to the destination. Thus, the source ships data and metadata by comparing two successive snapshots, the last one being the one that was diffed in the earlier replication cycle. When the data and metadata lands on the destination, the changes are applied to the destination mtree incrementally key-by-key to build a new one. There is a wait for all the transferring from the source to the destination to finish.

Once mtree A' at the destination is assembled, mtree A' replaces mtree A at the destination and is available for access. Old mtree A may then be deleted from the destination. The process then repeats at a next replication cycle. The technique shown in FIG. 29 may be referred to as snapshot-based replication.

Figure 30:
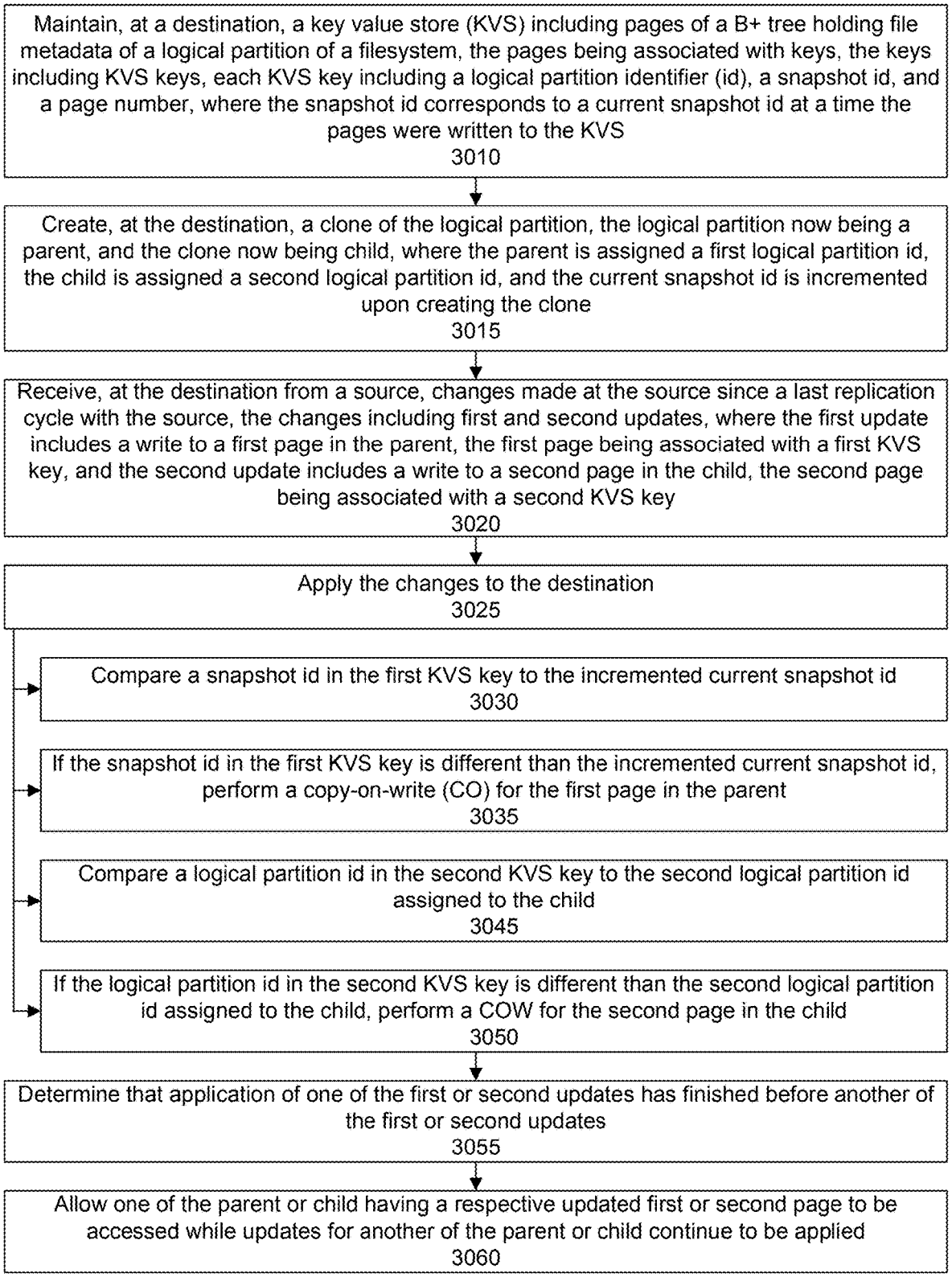
FIG. 30 shows a flow for handling replication from a source to a destination using a clone-based replication mechanism, according to one or more embodiments.
Figure 31:
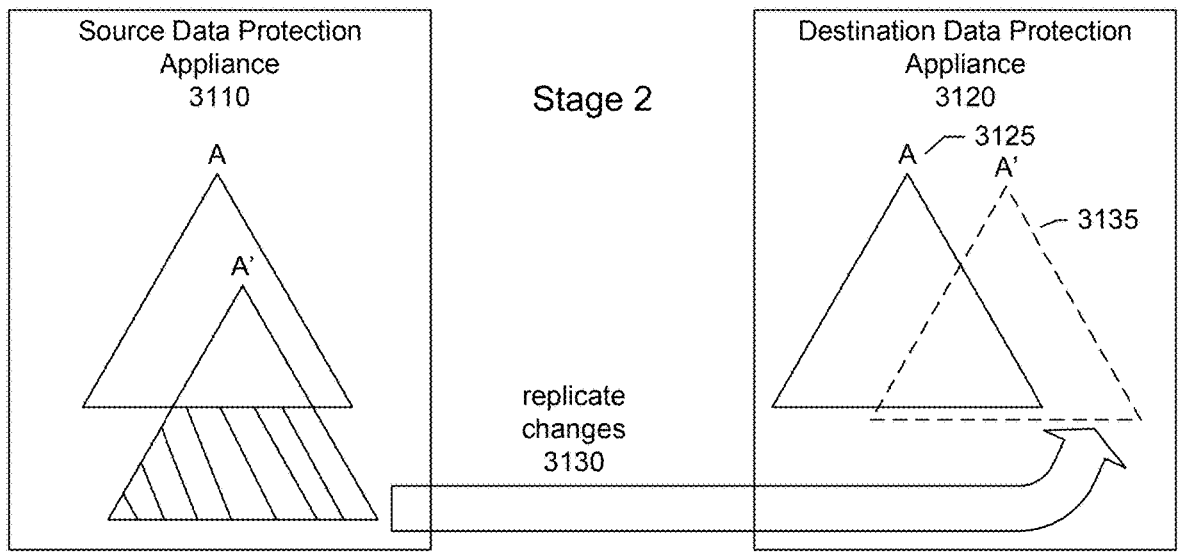
FIG. 31 shows a block diagram of replication from a source using a snapshot-based mechanism to a destination using a clone-based mechanism, according to one or more embodiments.

FIG. 30 shows a flow of a replication technique for an mtree that may be referred to as clone-based replication, according to one or more embodiments. FIG. 31 shows a block diagram for using clone-based replication at a destination 3120 where changes to an mtree at a source 3110 are replicated 3130 to the destination.

In an embodiment, clone-based replication employs a technique of cloning an mtree (or logical partition) A 3125 to create a clone at the destination using a technique such as shown in FIG. 12 and described in the discussion accompanying FIG. 12 and other earlier discussions. Using the cloning technique, a derived B+ tree 3135 of an Mtree can be constructed not only in real time, but metadata can be more efficiently shared with the B+ Tree of the parent Mtree.

And such B+ Tree derivation is more like an Mtree derivation itself and is constructed in more of logical constructs such as files and directories instead of individual keys (like inodes, dirents, hashes, and the like) by the built-in COW (copy-on-write) mechanism clones provide. Since each change of the user visible file system construct (aka file-by-file or directory-by-directory) reach destination, they can be applied to the base parent B+ Tree of the Mtree that had already landed in an earlier replication cycle to generate the consistent clone without needing to wait for all the data and metadata to land on the destination.

In clone-based replication, as the key-by-key and potentially any of the associated data as well, using the COW mechanism, a full-fledged new mtree is built as a clone of what already exists (which was there by the previous replication cycle). In this embodiment, the new clone is built not as a snapshot as in FIG. 29—which is not ready till all of the differences land on destination, nor key-by-key—but instead constructing the clone inode-by-inode and thus the new mtree (the clone) is a full-fledged mtree, readily accessible unlike a snapshot. In an embodiment, source structures are snapshot-based and destination structures are based on full-fledge mtrees.

In each replication technique, the mtree identifiers (e.g., mids) exist on both sides because both snapshot-based and clone-based replication construct mtrees on the destination. In the case of snapshot-based on the source, the source snapshot ids (e.g., sids) drive the traffic. In an embodiment, the source has a mid for each mtree and uses successive sids to diff them to find data and metadata differences to send to the destination. On destination, there is no longer a dependence on sids like source, but only mids. The new incremental mtree will have its own mid distinct from the mtree that landed there in the earlier replication cycle.

More particularly, referring back now to FIG. 30, in a step 3010, a key value store (KVS) is maintained at the destination. The KVS includes pages of a B+ tree holding file metadata of a logical partition of a file system. The page are associated with keys. The keys include KVS keys. Each KVS key includes a logical partition (e.g., mtree) identifier (id), a snapshot id, and a page number. The snapshot id corresponds to a current snapshot id at a time the pages were written to the KVS.

In a step 3015, a clone of the logical partition (e.g., mtree) is created at the destination, the logical partition now being a parent, and the clone now being a child, where the parent is assigned a first logical partition id (e.g., mtree 1), the child is assigned a second logical partition id (e.g., mtree 2), and the current snapshot id is incremented upon creating the clone.

In a step 3020, the destination receives, from the source, changes made at the source since a last replication cycle with the source. The changes include first and second updates. The first update includes a write to a first page in the parent. The first page is associated with a first KVS key. The second update includes a write to a second page in the child. The second page is associated with a second KVS key.

In a step 3025, the changes are applied at the destination. As shown in FIGS. 19 and 21, and described in the discussion accompanying the figures and elsewhere, applying the changes includes comparing parameters of the KVS keys associated with the pages against the current (or active) mtree id and current snapshot id to determine whether the updates should be applied by overwriting the existing pages or performing a COW.

For example, in a step 3030, a snapshot id in the first KVS key is compared to the incremented current snapshot id. In a step 3035, if the snapshot id in the first KVS key is different than the incremented current snapshot id, the COW is performed for the first page in the parent.

In a step 3045, a logical partition id (e.g., mtree id) in the second KVS key is compared to the second logical partition id assigned to the child. In a step 3050, if the logical partition id in the second KVS key is different than the second logical partition id assigned to the child, the COW is performed for the second page in the child.

Clone-based replication and, more particularly, the COW mechanism allows an update in one of the parent or child to be immediately visible before another update in another of the parent or child is still in the process of being applied.

For example, in a step 3055, a determination is made that application of one of the first or second updates has finished before another of the first or second updates. In a step 3060, one of the parent or child having a respective updated first or second page is allowed or made available for access while updates for another of the parent or child continue to be applied.

In an embodiment, rather than sending changes key-by-key to the destination, an impact of changes to a given inode are sent. A set of changes to the inode are sent together so that incremental changes made to a given file are applied atomically to mtree A' at the destination as a full-fledged (e.g., exposed) mtree. In an embodiment, an inode of mtree A maps into a corresponding inode on mtree A' in a copy-on-write manner. In other words, changes are handled by constructing a new inode with new records, while not touching mtree A as-is. Thus, at the destination, mtree A remains while mtree A' is immediately visible and exposed as an mtree. Changes are applied at the destination inode-by-inode rather than waiting for the entire mtree A' to arrive at the destination.

In an embodiment, replication of a logical partition (e.g., mtree) between a source and a destination includes a snapshot-based mechanism on the source and a clone-based mechanism on the destination (see, e.g., FIGS. 28 and 29). It should be appreciated, however, that another embodiment may use clones on the source as well. That is, having the destination side of FIG. 29 (stage 2) on source side as well. In at least some cases, that may not be a desirable practice because once a given replication cycle completes, any old clones on destination and/or source may be removed for space. It may be risker to do such destructive operations on the source and may not advisable. But the merit of clones allows the flexibility to provide clone-based replication on either or both sides of the replication.

The snapshot construct may be understood as a type of post-mortem construct or 'after thought' construct at a specific time after lapse of a specific interval. Basically, the active file set receives file or directory (dir) creations, deletions, overwrites and so forth, for however many files and dirs., like file_1, file_2, . . . file_ten_million even may get changed in however long an interval that a customer configures. After such time lapse, file system freezes the file set briefly and drains all the IO that already started, then takes a point in time copy of the B+ tree containing the metadata of the mtree, and preserves that point-in-time copy as the snapshot and reopens the active mtree for further IO. And thus snapshot is a post-mortem construct.

As compared to snapshots, clones provide a number of benefits. For example, the very moment file_1 is modified, be its data content or metadata to become file_1', even before file_2 morphs into its prime version, file_1' is visible in the cone of A, say A', which will be the clone of A. This A' may share, for example, 99.99 percent or most of the data as well as metadata with A and thus is very fast to create and very space efficient. For example, consider that at the destination, mtree A as the base contains a file set of 200 million files. As soon as changes to a particular file in the file set arrive at the destination, an mtree A' is created that may contain most, e.g., 99.99 percent, of base mtree A. The modified inode corresponding to the particular file reflects the copy-on-write operation occurring in mtree A'. Mtree A remains stable and consistent.

And at the same time, A' is a full-fledged Mtree on the same footing as its original, so to speak, parent A. And another beauty of clone is A1' is writable, but snapshots are read-only copies and can NOT be changed. And also, even to access file1' in the snapshot, there is a need to wait until, for example, file_ten_million becomes file_ten_million' (i.e., the snapshot interval is long and 10 million files change in that interval). Moreover, there is no programmatic API (e.g., Boost or NFS) access to file1' at all in the snapshot paradigm. However, as far as the clone mtree A' is concerned, as a construct it is no different from mtree A and its file_1, and thus file_1' in A' is readily accessible programmatically via A' clone mtree.

Being able to apply the source changes at the destination and expose the updated parent or child mtree at the destination before all the source changes have been applied allows for a number of benefits.

Figure 32:
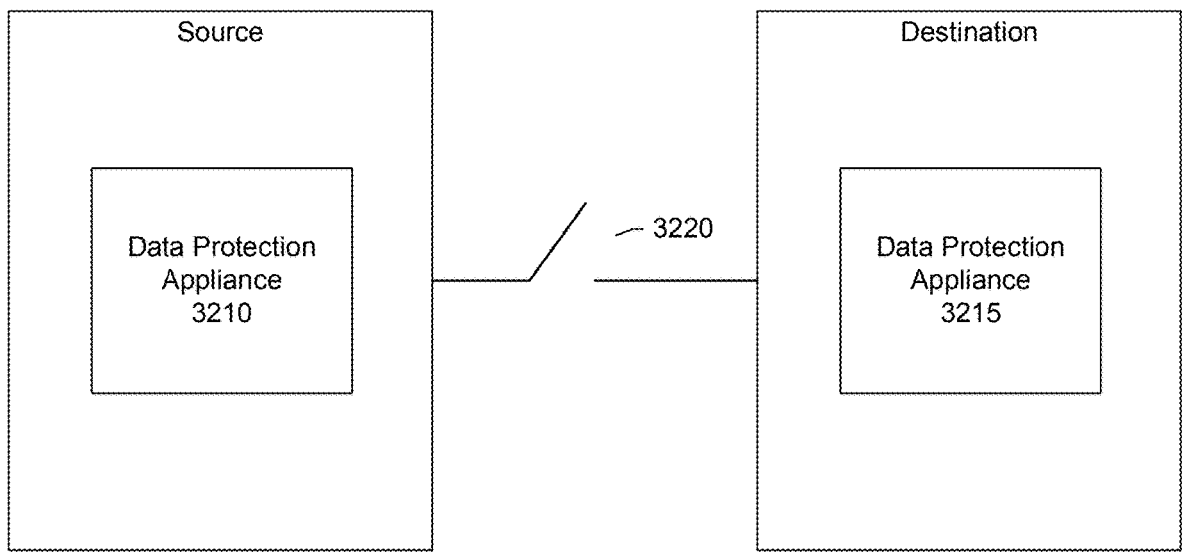
FIG. 32 shows a block diagram of replication from a source to a destination having a vault containing a data protection appliance, according to one or more embodiments.

FIG. 32 shows a block diagram of a configuration of an information processing system that may be referred to as cyber recovery. In cyber recovery, data from a primary data protection appliance 3210 (e.g., source) is replicated to a secondary data protection appliance 3215 (e.g., destination). The secondary data protection appliance may be referred to as a vault. A connection between the source and destination includes an operational air gap 3220. The air gap closes to provide access to the vault when replication is to occur. At other times, the air gap remains open, thereby preventing connections from being made to the vault. As another layer of security in the vault, the replicated data is retention locked for a period of time to prevent it from destruction in case attackers are able to gain access to the vault.

Thus, in an embodiment, a vault configuration involves replicating one or more source mtrees to a very tightly controlled destination. The entry and exit out of this destination are highly regulated by turning off the network and adding other layers of security when a replication cycle is not active. In an embodiment, on the destination, when the snapshot landing is completed, the newly completed refreshed destination mtree is copied into another mtree which is retention locked. So, the retention locking mechanism provides an additional level of security. When a calamity strikes the source, the retention locked mtree is again copied to another mtree inside the vault and traffic is reversed to the source to reconstruct it back.

To protect against the possibility of a virus at the source sliding into the destination, the vault may further conduct virus scanning. In an embodiment, the virus scanning relies on a third party scanning application or tool. That is, the scanning may be provided by a vender different from a vendor of the vault appliance. In an embodiment, the scanning applications inside the vault are triggered after the full snapshot lands at the destination. In an embodiment, the scan has to run on an accessible mtree which is generated again by copying the retention locked copy.

Figure 33:
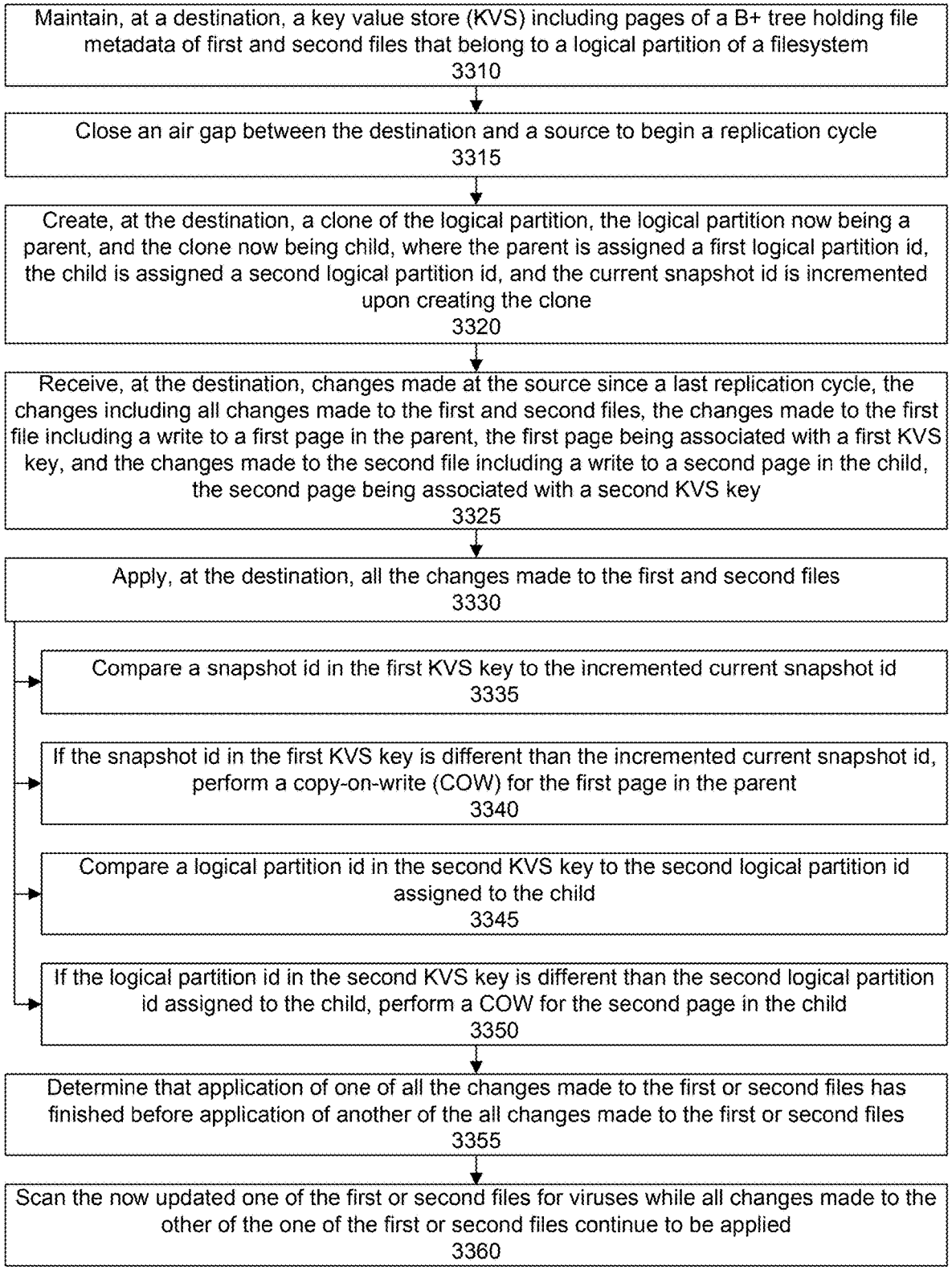
FIG. 33 shows a flow for handling replication involving a vault, according to one or more embodiments.

In another embodiment, clone-based mtree replication is provided at the destination to allow virus scanning of an updated file at the vault before or while other updates to other files are still in the process of being applied. More particularly, FIG. 33 shows a flow for cyber recovery, according to one or more embodiments. In a step 3310, a key value store (KVS) is maintained at a destination. As discussed, the key value store stores pages of a B+ tree holding file metadata such as metadata of first and second files that belong to a logical partition (e.g., mtree) of the filesystem. The pages are associated with keys. The keys include KVS keys. Each KVS key includes a logical partition identifier (id), a snapshot id, and a page number. The snapshot id corresponds to a current snapshot id at a time the pages were written to the KVS.

In a step 3315, an air gap between the destination and a source is closed to begin a replication cycle.

In a step 3320, a clone of the logical partition is created at the destination, the logical partition now being a parent, and the clone of the logical partition now being a child. The parent is assigned a first logical partition id (e.g., mtree 1), the child is assigned a second logical partition id (e.g., mtree 2), and the current snapshot id is incremented upon creation of the clone.

In a step 3325, the destination receives changes made at the source since a last replication cycle between the source and destination. The changes include all changes made to the first file and all changes made to the second file. The changes made to the first file include a write to a first page in the parent. The first page is associated with a first KVS key. The changes made to the second file include a write to a second page in the child. The second page is associated with a second KVS key.

In a step 3330, all the changes made to the first and second files are applied at the destination. As shown in FIGS. 19 and 21, and described in the discussion accompanying the figures and elsewhere, applying the changes includes comparing parameters of the KVS keys associated with the pages against the current (or active) mtree id and current snapshot id to determine whether the updates should be applied by overwriting the existing pages or performing a COW.

For example, in a step 3330, a snapshot id in the first KVS key is compared to the incremented current snapshot id. In a step 3340, if the snapshot id in the first KVS key is different than the incremented current snapshot id, a COW is performed for the first page in the parent.

In a step 3345, a logical partition id in the second KVS key is compared to the second logical partition id assigned to the child.

In a step 3350, if the logical partition id in the second KVS key is different than the second logical partition id assigned to the child, a COW is performed for the second page in the child.

In a step 3355, a determination is made that application of one of all the changes made to the first file or the second file has finished before application of another of all the changes made to the first file or the second file.

In a step 3360, the now updated one of the first file or second file is scanned for viruses while all changes made to another of the first file or second file continue to be applied.

For example, all the changes made to the first file may be applied before all the changes made to the second file are applied. In this case, scanning for viruses may begin on the updated first file while all the changes made to the second file continue to be applied.

Conversely, all the changes made to the second file may be applied before all the changes made to the first file are applied. In this case, scanning for viruses may begin on the updated second file while all the changes made to the first file continue to be applied. This allows any corruptions in the files to be detected much sooner as compared to having to wait until all changes to all files have been applied. In other words, mtree A' at the destination and holding file metadata for a first file is immediately accessible once changes to the first file have been applied even if changes for a second file have yet to be applied.

In a disaster recover (DR) scenario, the traffic between the source and destination may be reversed to recover the source. In this embodiment, mtree A at the destination may be cloned to create mtree A' at the destination and without having to conduct a metadata copy. Clone mtree A' (and not mtree A) at the destination may then be exposed to recover the source. That is, clone mtree A' at the destination is exposed to reads from the source and not mtree A. Mtree A at the destination can remain retention locked and protected.

In a disaster recovery scenario, the source and destination may offer similar levels of security. Cyber recovery (CR), however, can be configured in cases where the source may be, for example, a financial or any critical institution that wishes to save a portion some critical data into a very tightly protected destination that may be referred to as a vault. In an embodiment, cyber recovery uses replication to send data to a vaulted data protection appliance via tightly controlled networking and timing windows.

In an embodiment, such data does not directly land into a secure mtree but into a landing mtree. Once all of the snapshot diffs land there, then such landed contented is copied into a retention locked vault mtree. A fast copying technique may be used that avoids reading or writing data and instead updates metadata appropriately to speed the copying. It is this mtee which is highly secure. Thus, in this embodiment, each source mtree needs a landing mtree to replicate to, and then a vaulted mtree to seal it for safety. And it needs yet another mtree since the vaulted content needs to be checked for viruses, and so forth. To do that, again vaulted content is (fast) copied into yet another temporary mtree so that a third party virus scan app can scan. This temporary mtree is necessary because cyber recovery practice does not allow neither read nor write access directly to the retention locked vaulted mtree. And should a disaster strike and source needs to be reconstructed, cyber recovery practice in this embodiment uses another temporary mtree to make a (fast) copy out of the vault and reverse the replication back to source. And again, this temporary mtree is used because in an embodiment, cyber recovery does not expose the vault directly under any circumstance.

In another embodiment, however, cloned-based replication is provided for cyber recovery (CR) configurations. Clones are full-fledged mtrees, which alone can be used by third party applications or reverse replication to reconstruct the source. So, they provide a more elegant mechanism implicitly. Clones make copying content very fast.

Cloned mtrees can have their own properties distinct from their parents. In a cyber recovery configuration, for example, if the parent mtree is retention locked, such property will not be violated when content is accessed via the cloned mtree by its own mechanisms.

So, either for periodic virus scans or reverse replication to reconstruct the source, clones reduce the laborious data/metadata copying, fast or slow. Clones can fill that gap instantly and naturally.

Clones can provide multifaceted benefits. Below are some of the benefits.

1) Mtree replication using clones on the vault destination allows landing files and directories to be immediately visible on the destination. This vastly improves a capable scanning application to detect virus and malware infestations in real time instead of waiting for full snapshot to arrive, and then scan.
2) Ultimately either to reconstruct a source due to the need to execute a disaster recovery and/or for scanning purposes, the procedure needs an accessible mtree mechanism. Clone technology implicitly and readily provides this capability.
3) A snapshot-based mechanism includes a large amount of copying occurring in the vault. For example, metadata and data land first into an mtree in the destination. It is then transferred into yet another mtree for retention, which in turn gets copied into yet another mtree to provide access for scanning and DR reverse recovery. In an embodiment, an mtree clone mechanism can eliminate these staging copying implicitly by natively exposing the new file set image as an mtree itself, which is anyway the ultimate user consumable mechanism.

Figure 34:
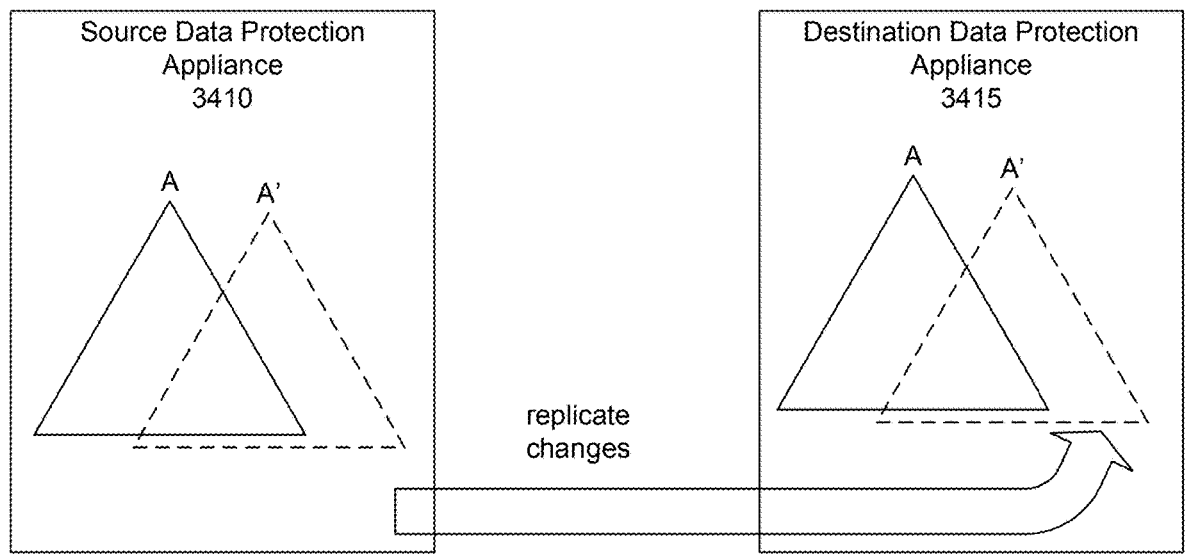
FIG. 34 shows a block diagram of replication where both the source and destination include clone-based mechanisms for replication, according to one or more embodiments.
Figure 35:
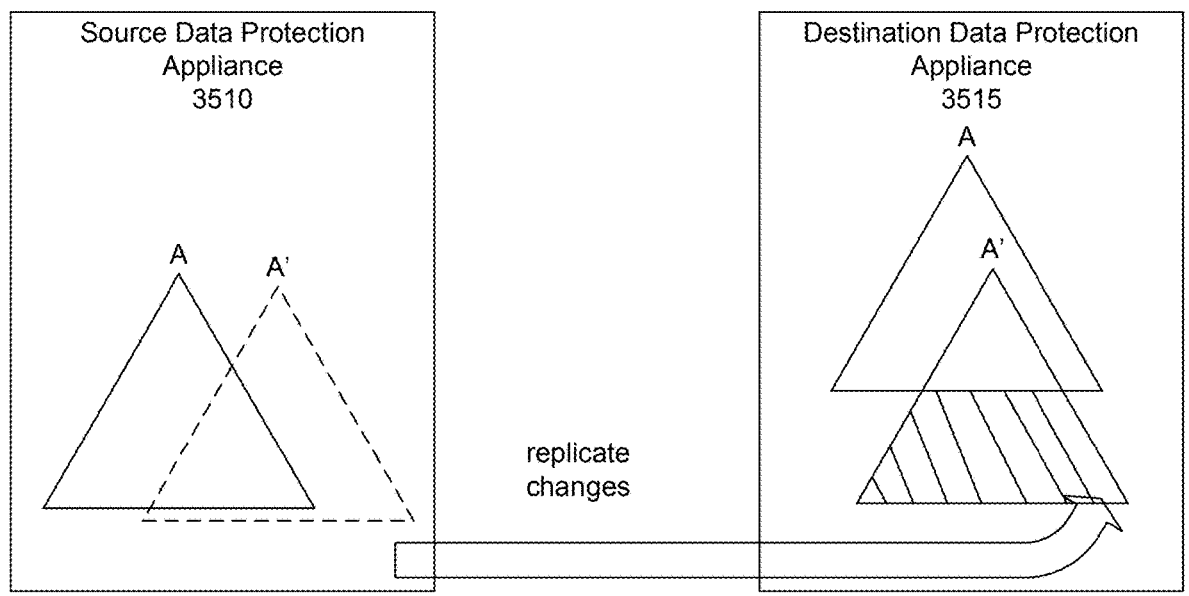
FIG. 35 shows a block diagram of replication where the source includes a clone-based mechanism and the destination includes a snapshot-based mechanism, according to one or more embodiments.

In various embodiments, there can be different combinations of snapshot-based and clone-based mechanisms at the source and destination data protection appliances. For example, FIG. 31 shows a configuration where the source appliance relies on snapshot-based replication and the destination appliance relies on clone-based replication. FIG. 34 shows a configuration where a source appliance 3410 relies on clone-based replication and a destination appliance 3415 relies on clone-based replication. FIG. 35 shows a configuration where a source appliance 3510 relies on clone-based replication and a destination appliance 3515 relies on snapshot-based replication.

In an embodiment, there is a data protection appliance an integrated operating system and infrastructure as well as the application layer which forms the file system. Any and every change anywhere in the whole operating system may require a version change. There is a need to address backward compatibility. So, in a given data center or for a given customer, there could be a variety of data protection appliance configurations and large number of them. Sometimes the hardware capabilities of a given appliance may not even allow upgrading the software layer. So, backward compatibility is important to whole software layer.

Consider, as an example, a version 1 of the appliance OS having snapshot-based replication. Version 2 is clone-based replication. Now imagine a data center having a mixture of v1 and v2 version appliances. Replication may be configured between appliances having different (or the same)

replication mechanisms. For example, a first configuration may include snapshot-based replication at the source and destination. A second configuration may include snapshot-based replication at the source and clone-based replication at the destination (see, e.g., FIG. 31). A third configuration may include clone-based replication at the source and clone-based replication at the destination (see, e.g., FIG. 34). A fourth configuration may include clone-based replication at the source and snapshot-based replication at the destination (see, e.g., FIG. 35).

Thus, in various embodiments, both source and destination sides may use clones (e.g., hence use just mids on both sides). That is, the source diffs clones, sends diffs top destination, and destination builds a new clone on top of the earlier replication cycle one to build a new mid (or mtree). In another embodiment, the source may use clones like the above one to send diffs, but destination uses sids to construct an incremental.

In an embodiment, snapshot-based replication at the source includes diffing the B+ trees corresponding to the latest snapshot and that of the earlier cycle. The differences such as the effect of adding, deleting, updating files, etc from the user view of it are found key-by-key. As discussed, each file includes multiple keys (see, e.g., FIG. 7), for instance, indirect block record (aka what all the blocks a file's data occupies), dirent (aka file name), hashes (for locating the file in the btree), attributes, ACLs and so multiple keys. As each key lands on the destination, snapshot-based replication at the destination applies key-by-key changes. So if keys 1, 2, and 3 of a file changes, keys 1, 2, and 3 arrive in that order at the destination, and are applied in that order. Until key 3 arrives at the destination, the entire change is not reflected on the destination. And until all changes between snapshots arrive at the destination, whole new mtree is not reflected.

In the case of clones, however, this change on the source is applied at the inode level. Keys for a file, e.g., key1, key2, key3 are applied together because of which by the end of one application, the file is ready. Certainly, both snapshot-based and clone-based replication require all changes pertaining to an inode to be applied for file to be accessible on the destination, but another file's change (e.g., file 2) does not depend on that of a different file (e.g., file 1) as in snapshot-based replication. In other words, the new mtree is instantly consistent at file granularity instead of key granularity and thus it does not have to wait for all the changes between snapshots to arrive at the destination to be consistent.

In an embodiment, once a given replication cycle completes, any old clones on the destination and/or source may be removed for space. For example, referring back now to FIG. 31, parent mtree A 3125 at the destination may be deleted once all the updates are applied. In practice, however, customers are recommended to keep a predetermined number of old mtrees. Consider, as an example, that a process generates an mtree A' once a day for 7 days on top of the earlier day's mtree A. The customer may be advised to keep a past 7 days. This advice is discretionary, subject to space provisions on the destination side.

Any shared pages between a parent and child clone not updated belong to the child. Thus, even if the older mtree A is deleted, the new mtree A' keeps not only the updated content but also the unmodified content of mtree A automatically due to the COW mechanism. Further, as discussed, a clone is a full-fledged mtree that supports all protocols like NFS, BOOST, and the like unlike snapshots.

In an embodiment, as the source mtree progresses in time with updates and replicates such changes to destination to generate diverging clone will present the 'as if source image' at the destination as an accessible full-fledged mtree open to all file access protocols such as NFS, BOOST, and so forth. The time diverging clone, being a full-fledged Mtree, allows more flexible control of its own properties without disturbing any parent mtree.

And being a clone, divergence automatically and instantly provides an accessible mtree view of the control without elaborate copying, however fast such copying may be. And clones also provide some limiting the explosion of mtrees (for there will be limits on number of mtrees based on protection appliance configurations) by repurposing the clones if appropriate.

In an embodiment, a method includes: maintaining a key value store (KVS) comprising pages of a B+ tree holding file metadata of a logical partition of a filesystem, the pages being associated with KVS keys, each KVS key comprising a logical partition identifier (ID), a snapshot ID, and a page number; creating a clone of the logical partition, the logical partition now being a parent, and the clone now being a child, wherein the parent is assigned a first logical partition ID, the child is assigned a second logical partition ID, and the creating comprises: grouping the parent and the child into a metadata group at which garbage collection is conducted; creating a snapshot of the parent and incrementing the snapshot ID to a current snapshot ID; and pointing the child to the snapshot; receiving a request to write to a first page in the parent, the first page being associated with a first KVS key; when a snapshot ID in the first KVS key is different than the current snapshot ID, performing a copy-on-write (COW) for the first page; receiving a request to write to a second page in the child, the second page being associated with a second KVS key; and when a logical partition ID in the second KVS key is different than the second logical partition ID assigned to the child, performing a COW for the second page.

In an embodiment, a method includes: maintaining a key value store comprising pages of a B+ tree holding file metadata of a logical partition of a filesystem, the pages being associated with keys through which the pages are retrieved from the key value store; naming the keys; creating a clone of the logical partition, the logical partition now being a parent, and the clone now being a child; using the naming of the keys to allow the pages stored in the key value store to be read by any of the parent or the child; and using the naming of the keys to allow any of the parent or the child to make updates to the pages, wherein updated pages are owned by a respective parent or child that made the updates, and pages not updated remain accessible by any of the parent or the child.

In an embodiment, the keys comprise routing keys, each routing key comprising a routing key prefix, and the method further comprises: grouping the parent and the child into a metadata group; naming the routing key prefix with a metadata group identifier (id) of the metadata group, the pages of the parent and the child thereby having the same routing key prefix; receiving a request from the parent to read a page from the key value store, the page being associated with a routing key; examining a prefix of the routing key to retrieve the page from the key value store for the parent; receiving a request from the child to read the page from the key value store, the page being associated with the routing key; and examining the prefix of the routing key to retrieve the same page from the key value store for the child.

In an embodiment, the keys comprise routing keys, each routing key comprising a routing key prefix, and the method further comprises: grouping the parent and the child into a metadata group; naming the routing key prefix with a metadata group identifier (id) of the metadata group, the pages of the parent and the child thereby having the same routing key prefix; obtaining the routing keys to perform a garbage collection; examining pages of the routing keys, the examination thereby including pages referenced by any of the parent or the child because the pages of the parent and the child have the same routing key prefix; and cleaning pages that are no longer referenced by any of the parent or the child.

In an embodiment, the keys comprise KVS keys and the method further comprises: naming the KVS keys with a snapshot identifier (id) and a page number; writing the KVS keys to the key value store, the pages stored in the key value store thereby being written with the KVS keys comprising the snapshot id and the page number; creating a snapshot of the parent for the cloning; pointing the child to the snapshot; incrementing the snapshot id to a current snapshot id, the pages stored in the key value store remaining written with the KVS keys comprising the snapshot id and the page number; upon the parent attempting to write to a page, comparing a snapshot id in a KVS key associated with the page to the current snapshot id; and if the snapshot id in the KVS key is less than the current snapshot id, performing a copy-on-write (COW) operation for the write, the COW comprising writing to the key value store a new KVS key, the new KVS key comprising a logical partition id of the parent, the current snapshot id, and the page number.

In an embodiment, the keys comprise KVS keys and the method further comprises: naming the KVS keys with a logical partition identifier (id), a snapshot id, and a page number; writing the KVS keys to the key value store, the pages stored in the key value store thereby being written with the KVS keys comprising the logical partition id, the snapshot id, and the page number; creating a snapshot of the parent for the cloning; pointing the child to the snapshot; and incrementing the snapshot id to a current snapshot id, the pages stored in the key value store remaining written with the KVS keys comprising the logical partition id, the snapshot id, and the page number.

In an embodiment, the method further includes: intercepting a write to a page from one of the parent or the child; comparing a logical partition id of the one of the parent or the child and a logical partition id in a KVS key associated with the page; if the logical partition id of the one of the parent or the child is different from the logical partition id in the KVS key associated with the page, performing a copy-on-write (COW) operation for the write; if the logical partition id of the one of the parent or the child is the same as the logical partition id in the KVS key associated with the page, comparing the current snapshot id and a snapshot id in the KVS key associated with the page; if the current snapshot id is different from the snapshot id in the KVS key associated with the page, performing the COW operation for the write; and if the current snapshot id is the same as the snapshot id in the KVS key associated with the page, overwriting the page, wherein the performing the COW operation comprises writing to the key value store a new KVS key, the new KVS key comprising a logical partition id of the one of the parent or the child, the current snapshot id, and the page number.

In another embodiment, there is a method comprising: maintaining, at a destination site, a key value store (KVS) comprising pages of a B+ tree holding file metadata of a logical partition of a filesystem, the pages being associated with KVS keys, each KVS key comprising a logical partition identifier (ID), a snapshot ID, and a page number, the snapshot ID corresponding to a current snapshot ID; creating, at the destination site, a clone of the logical partition, the logical partition now being a parent, and the clone now being a child, wherein the parent is assigned a first logical partition ID, the child is assigned a second logical partition ID, and the current snapshot ID is incremented; receiving, at the destination site from a source site, a plurality of changes made at the source site since a last replication cycle, the plurality of changes comprising first and second updates, wherein the first update comprises a write to a first page in the parent, the first page being associated with a first KVS key, and wherein the second update comprises a write to a second page in the child, the second page being associated with a second KVS key; and applying the plurality of changes to the destination site, the applying comprising: when a snapshot ID in the first KVS key is different than the incremented current snapshot ID, performing a copy-on-write (COW) for the first page in the parent and allowing the parent having the updated first page to be accessed before all the plurality of changes have been applied; and when a logical partition ID in the second KVS key is different than the second logical partition ID assigned to the child, performing a COW for the second page in the child and allowing the child having the updated second page to be accessed before all the plurality of changes have been applied. Creating, at the destination site, a clone may include creating a reference to a root page of the parent.

In another embodiment, there is a method comprising: maintaining, at a destination site, a key value store (KVS) comprising pages of a B+ tree holding file metadata of a logical partition of a filesystem, the pages being associated with keys, the keys comprising KVS keys, each KVS key comprising a logical partition identifier (id), a snapshot id, and a page number, wherein the snapshot id corresponds to a current snapshot id at a time the pages were written to the KVS; creating, at the destination site, a clone of the logical partition, the logical partition now being a parent, and the clone now being a child, wherein the parent is assigned a first logical partition id, the child is assigned a second logical partition id, and the current snapshot id is incremented upon creation of the clone; receiving, at the destination site from the source site, a plurality of changes made at the source site since a last replication cycle, the plurality of changes comprising first and second updates, wherein the first update comprises a write to a first page in the parent, the first page being associated with a first KVS key, and wherein the second update comprises a write to a second page in the child, the second page being associated with a second KVS key; and applying the plurality of changes to the destination site, the applying comprising examining the first and second KVS keys to determine whether a copy-on-write (COW) operation should be performed; determining that the second update comprising the write to the second page in the child has finished before first update; and allowing the child having the updated second page to be accessed before all the plurality of changes have been applied.

Applying the plurality of changes to the destination site further may include: comparing a snapshot id in the first KVS key with the incremented current snapshot id; determining that the snapshot id in the first KVS key is different than the incremented current snapshot id; and upon the determination that the snapshot id is different, performing the COW for the first page in the parent.

Performing the COW for the first page in the parent may include: writing a new key to the KVS, the new KVS key comprising the first logical partition id, the incremented current snapshot id, and a page number of the first page.

Applying the plurality of changes to the destination site may include: comparing a logical partition id in the second KVS key with the second logical partition id assigned to the child; determining that the logical partition id in the second KVS key is different than the second logical partition id assigned to the child; and upon the determination that the logical partition id in the second KVS key is different than the second logical partition id assigned to the child, performing the COW for the second page in the child.

In an embodiment, the keys comprise routing keys, each routing key comprising a routing key prefix, and the method further comprises: grouping the parent and the child into a metadata group; naming the routing key prefix with a metadata group id of the metadata group, the pages of the parent and the child thereby having the same routing key prefix; receiving a request from the parent to read a page from the key value store, the page being associated with a routing key; examining a prefix of the routing key to retrieve the page from the key value store for the parent; receiving a request from the child to read the page from the key value store, the page being associated with the routing key; and examining the prefix of the routing key to retrieve the same page from the key value store for the child.

In an embodiment, the keys comprise routing keys, each routing key comprising a routing key prefix, and the method further comprises: grouping the parent and the child into a metadata group; naming the routing key prefix with a metadata group identifier (id) of the metadata group, the pages of the parent and the child thereby having the same routing key prefix; obtaining the routing keys to perform a garbage collection; examining pages of the routing keys, the examination thereby including pages referenced by any of the parent or the child because the pages of the parent and the child have the same routing key prefix; and cleaning pages that are no longer referenced by any of the parent or the child.

In another embodiment, there is a method comprising: maintaining, at a destination site, a key value store (KVS) comprising pages of a B+ tree holding file metadata of first and second files that belong to a logical partition of a filesystem, the pages being associated with KVS keys, each KVS key comprising a logical partition identifier (ID), a snapshot ID, and a page number, the snapshot ID corresponding to a current snapshot ID; creating, at the destination site, a clone of the logical partition, the logical partition now being a parent, and the clone now being a child, wherein the parent is assigned a first logical partition ID, the child is assigned a second logical partition ID, and the current snapshot ID is incremented; receiving, at the destination site from a source site, a plurality of changes made at the source site since a last replication cycle, the plurality of changes comprising all changes made to the first file, and all changes made to the second file, wherein the changes made to the first file comprises a write to a first page in the parent, the first page being associated with a first KVS key, and wherein the changes made to the second file comprises a write to a second page in the child, the second page being associated with a second KVS key; applying, at the destination site, all the changes made to the first file, and all the changes made to the second file, the applying comprising: when a snapshot ID in the first KVS key is different than the incremented current snapshot ID, performing a copy-on-write (COW) for the first page in the parent; and when a logical partition ID in the second KVS key is different than the second logical partition ID assigned to the child, performing a COW for the second page in the child; when application of all the changes made to the first file finishes before application of all the changes made to the second file, allowing the now updated first file to be scanned for viruses while all the changes made to the second file continue to be applied; and when application of all the changes made to the second file finishes before application of all the changes made to the first file, allowing the now updated second file to be scanned for viruses while all the changes made to the first file continue to be applied.

In another embodiment, there is a method comprising: maintaining, at a destination site, a key value store (KVS) comprising pages of a B+ tree holding file metadata of first and second files that belong to a logical partition of a filesystem, the pages being associated with keys, the keys comprising KVS keys, each KVS key comprising a logical partition identifier (id), a snapshot id, and a page number, wherein the snapshot id corresponds to a current snapshot id at a time the pages were written to the KVS; creating, at the destination site, a clone of the logical partition, the logical partition now being a parent, and the clone now being a child, wherein the parent is assigned a first logical partition ID, the child is assigned a second logical partition id, and the current snapshot id is incremented upon creation of the clone; receiving, at the destination site from a source site, a plurality of changes made at the source site since a last replication cycle, the plurality of changes comprising all changes made to the first file, and all changes made to the second file, wherein the changes made to the first file comprises a write to a first page in the parent, the first page being associated with a first KVS key, and wherein the changes made to the second file comprises a write to a second page in the child, the second page being associated with a second KVS key; applying, at the destination site, all changes made to the first and second files, the applying comprising examining the first and second KVS keys, first and second logical partition ids, and incremented current snapshot ID to determine whether a copy-on-write (COW) operation should be performed for one or more of the first page in the parent or the second page in the child; determining that application of one of all changes made to the first or second files has finished before application of another of the one of all changes made to the first or second files; and scanning the now updated one of the first or second files for viruses while all changes made to the other of the one of the first or second files continue to be applied.

Applying, at the destination site, all changes made to the first file, and all changes made to the second file may include: comparing a snapshot id in the first KVS key with the incremented current snapshot id; when the snapshot id in the first KVS key is different than the incremented current snapshot id, performing the COW for the first page in the parent.

Applying, at the destination site, all changes made to the first file, and all changes made to the second file may include: comparing a logical partition id in the second KVS key with the second logical partition id assigned to the child; and when the logical partition id in the second KVS key is different than the second logical partition id assigned to the child, performing a COW for the second page in the child.

In an embodiment, the keys comprise routing keys, each routing key comprising a routing key prefix, and the method further comprises: grouping the parent and the child into a metadata group; naming the routing key prefix with a metadata group id of the metadata group, the pages of the parent and the child thereby having the same routing key prefix; receiving a request from the parent to read a page from the key value store, the page being associated with a routing key; examining a prefix of the routing key to retrieve the page from the key value store for the parent; receiving a request from the child to read the page from the key value store, the page being associated with the routing key; and examining the prefix of the routing key to retrieve the same page from the key value store for the child.

In an embodiment, the keys comprise routing keys, each routing key comprising a routing key prefix, and the method further comprises: grouping the parent and the child into a metadata group; naming the routing key prefix with a metadata group identifier (id) of the metadata group, the pages of the parent and the child thereby having the same routing key prefix; obtaining the routing keys to perform a garbage collection; examining pages of the routing keys, the examination thereby including pages referenced by any of the parent or the child because the pages of the parent and the child have the same routing key prefix; and cleaning pages that are no longer referenced by any of the parent or the child.

The method may include: closing an air gap between the source site and the destination site to transmit the plurality of changes from the source site to the destination site. The method may include: after the scanning for viruses has finished on the now updated one of the first or second files, retention locking the now updated one of the first or second files while all changes made to the other of the one of the first or second files continue to be applied.

Figure 36:
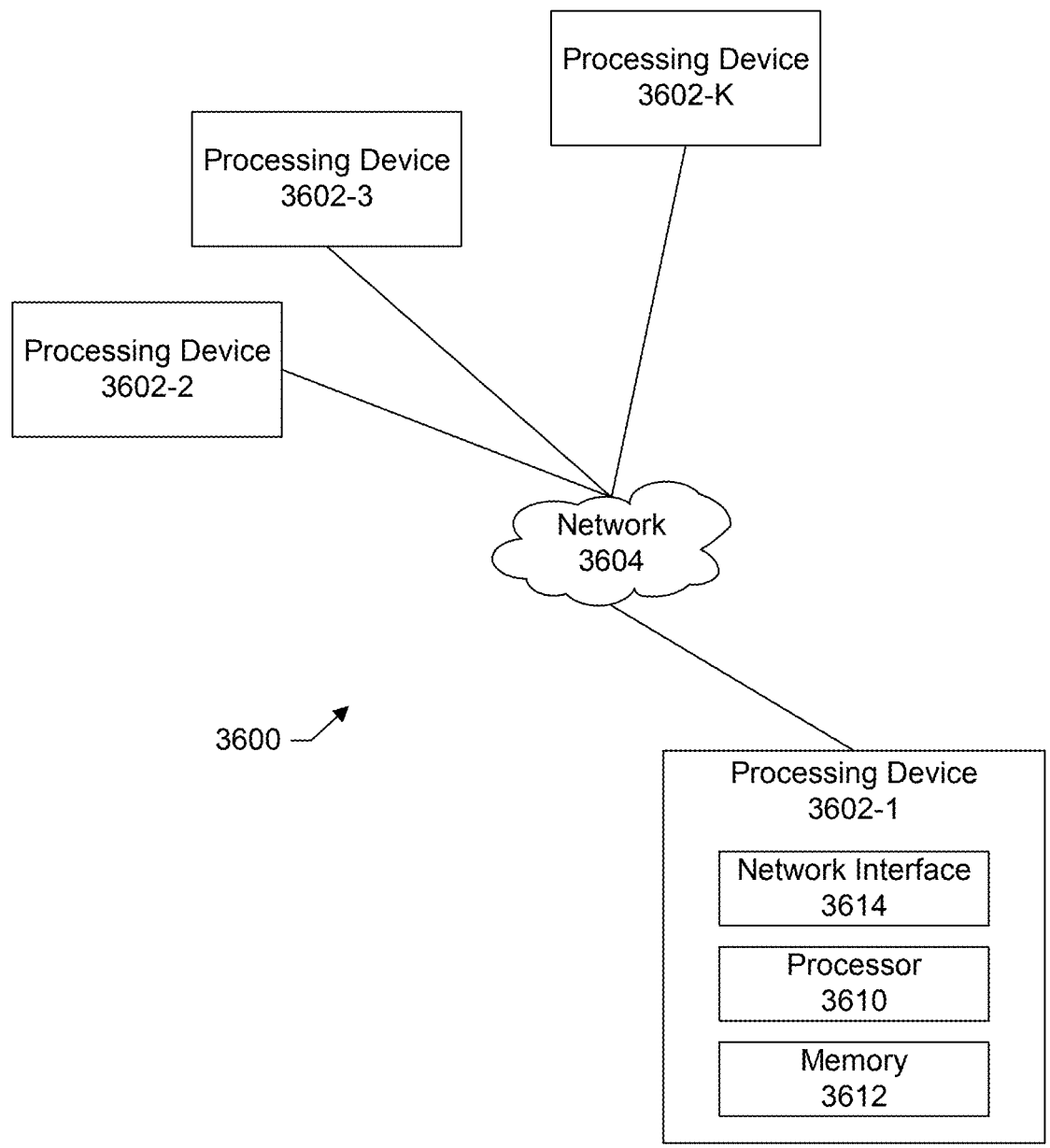
FIG. 36 shows a block diagram of a processing platform that may be utilized to implement at least a portion of an information processing system, according to one or more embodiments.

FIG. 36 shows an example of a processing platform 3600 that may include at least a portion of the information handling system shown in FIG. 1. The example shown in FIG. 36 includes a plurality of processing devices, denoted 3602-1, 3602-2, 3602-3, . . . 3602-K, which communicate with one another over a network 3604.

The network 3604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 3602-1 in the processing platform 3600 comprises a processor 3610 coupled to a memory 3612.

The processor 3610 may comprise a microprocessor, a microcontroller, an application-specific integrated circuit (ASIC), a field-programmable gate array (FPGA) or other type of processing circuitry, as well as portions or combinations of such circuitry elements.

The memory 3612 may comprise random access memory (RAM), read-only memory (ROM) or other types of memory, in any combination. The memory 3612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 3602-1 is network interface circuitry 3614, which is used to interface the processing device with the network 3604 and other system components, and may comprise conventional transceivers.

The other processing devices 3602 of the processing platform 3600 are assumed to be configured in a manner similar to that shown for processing device 3602-1 in the figure.

Again, the particular processing platform 3600 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 37:
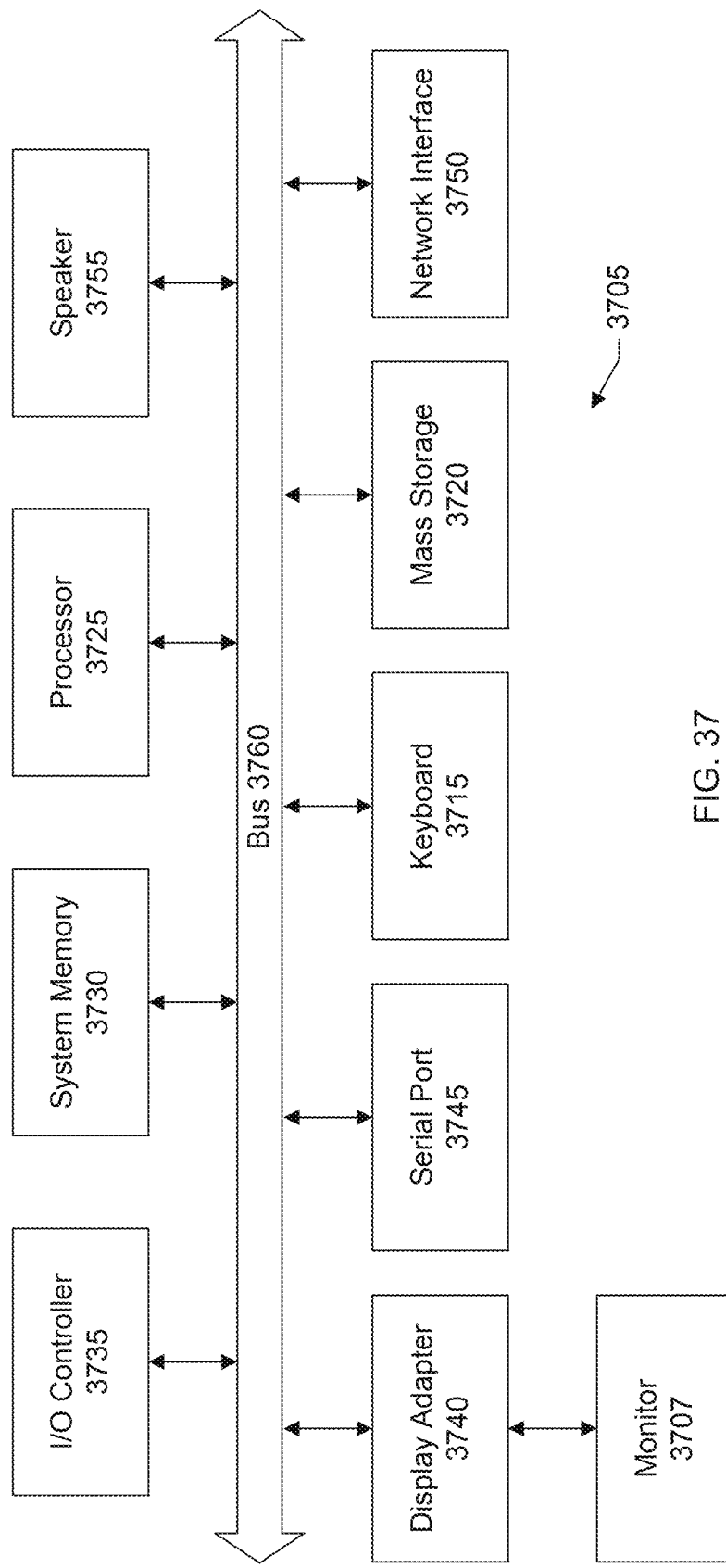
FIG. 37 shows a block diagram of a computer system suitable for use with the system, according to one or more embodiments.

FIG. 37 shows a system block diagram of a computer system 3705 used to execute the software of the present system described herein. The computer system includes a monitor 3707, keyboard 3715, and mass storage devices 3720. Computer system 3705 further includes subsystems such as central processor 3725, system memory 3730, input/output (I/O) controller 3735, display adapter 3740, serial or universal serial bus (USB) port 3745, network interface 3750, and speaker 3755. The system may also be used with computer systems with additional or fewer subsystems. For example, a computer system could include more than one processor 3725 (i.e., a multiprocessor system) or a system may include a cache memory.

Arrows such as 3760 represent the system bus architecture of computer system 3705. However, these arrows are illustrative of any interconnection scheme serving to link the subsystems. For example, speaker 3755 could be connected to the other subsystems through a port or have an internal direct connection to central processor 3725. The processor may include multiple processors or a multicore processor, which may permit parallel processing of information. Computer system 3705 shown in FIG. 37 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
creating, at a destination appliance, a clone of a logical partition of a filesystem, the logical partition of the filesystem being a parent, and the clone being a child, wherein the creating the clone of the logical partition includes:
maintaining a key value store (KVS) comprising pages of a B+ tree holding file metadata of the logical partition of the filesystem, the pages being associated with KVS keys through which the pages are retrieved from the key value store;
naming the KVS keys to the pages by inserting different types of identifiers into the KVS keys, wherein the naming the KVS keys includes naming with a snapshot identifier (id) and a page number; and
storing, using the naming of the keys, the pages in the key value store to be read by any of the parent or the child, wherein the KVS keys comprise routing keys, each routing key of the routing keys comprising a routing key prefix;
receiving a request from the parent or the child to update the pages;
in response to the receiving the request:
issuing a command including a routing key suffix to the KVS to allow any of the parent or the child to update the pages using the naming of the keys;
making, by the parent or the child based on changes received from a source since a last replication cycle, updates to the pages while pages that are not updated remain accessible by any of the parent or the child;
writing, by a computer system, the KVS keys to the KVS, the pages stored in the KVS thereby being written with the KVS keys comprising the snapshot id and page number;
creating, by the computer system, a snapshot of the parent for the cloning of the logical partition, wherein the creating the snapshot of the parent comprises:
pointing the child to the snapshot;
incrementing the snapshot id to a current snapshot id, the pages stored in the key value store remaining written with the KVS keys comprising the snapshot id and the page number;
upon the parent attempting to write to a page of the pages, comparing a snapshot id in a KVS key of the KVS keys associated with the page to a current snapshot id;
when the snapshot id in the KVS key is less than the current snapshot id, performing a copy-on-write (COW) operation for the write, the COW comprising writing to the KVS a new KVS key, the new KVS key comprising a logical partition id of the parent, the current snapshot id, and the page number; and
when the snapshot id in the KVS key is same as the current snapshot id, overwriting the page of the pages;
obtaining the routing keys from a module executed on the computer system to perform a garbage collection; and
performing the garbage collection including examining, by the computer system, pages of the routing keys, wherein the examining the pages of the routing keys comprises including, in a metadata group, pages of the updated pages referenced by any of the parent or the child when the pages of the parent and the child have a same routing key prefix; and
cleaning, based on the examining of the pages at the tree to achieve parallelism in the filesystem, pages that are no longer referenced by any of the parent or the child in the metadata group.

2. The method of claim 1 wherein the keys comprise routing keys, each routing key comprising a routing key prefix, and the method further comprises:
grouping the parent and the child into a metadata group;
naming the routing key prefix with a metadata group identifier (id) of the metadata group, the pages of the parent and the child thereby having the same routing key prefix;
receiving a request from the parent to read a page from the key value store, the page being associated with a routing key;
examining a prefix of the routing key to retrieve the page from the key value store for the parent;

receiving a request from the child to read the page from the key value store, the page being associated with the routing key; and examining the prefix of the routing key to retrieve the same page from the key value store for the child.

3. The method of claim 1 wherein the keys comprise routing keys, each routing key comprising a routing key prefix, and the method further comprises:

grouping the parent and the child into a metadata group; and naming the routing key prefix with a metadata group identifier (id) of the metadata group, the pages of the parent and the child thereby having the same routing key prefix.

4. The method of claim 1 wherein the keys comprise KVS keys and the method further comprises:

naming the KVS keys with a logical partition identifier (id), a snapshot id, and a page number;

writing the KVS keys to the key value store, the pages stored in the key value store thereby being written with the KVS keys comprising the logical partition id, the snapshot id, and the page number;

creating a snapshot of the parent for the cloning;

pointing the child to the snapshot; and incrementing the snapshot id to a current snapshot id, the pages stored in the key value store remaining written with the KVS keys comprising the logical partition id, the snapshot id, and the page number.

5. The method of claim 4 further comprising:

intercepting a write to a page from one of the parent or the child;

comparing a logical partition id of the one of the parent or the child and a logical partition id in a KVS key associated with the page;

if the logical partition id of the one of the parent or the child is different from the logical partition id in the KVS key associated with the page, performing a copy-on-write (COW) operation for the write;

if the logical partition id of the one of the parent or the child is same as the logical partition id in the KVS key associated with the page, comparing the current snapshot id and a snapshot id in the KVS key associated with the page; and if the current snapshot id is different from the snapshot id in the KVS key associated with the page, performing the COW operation for the write, wherein the performing the COW operation comprises writing to the key value store a new KVS key, the new KVS key comprising a logical partition id of the one of the parent or the child, the current snapshot id, and the page number.

6. A system comprising:

a processor; and memory configured to store one or more sequences of instructions which, when executed by the processor, cause the processor to carry out steps of:

creating, at a destination appliance, a clone of a logical partition of a filesystem, the logical partition of the filesystem being a parent, and the clone being a child, wherein the creating the clone of the logical partition includes:

maintaining a key value store (KVS) comprising pages of a B+ tree holding file metadata of the logical partition of the filesystem, the pages being associated with KVS keys through which the pages are retrieved from the key value store;

naming the KVS keys to the pages by inserting different types of identifiers into the KVS keys, wherein the naming the KVS keys includes naming with a snapshot identifier (id) and a page number; and storing, using the naming of the keys, the pages in the key value store to be read by any of the parent or the child, wherein the KVS keys comprise routing keys, each routing key of the routing keys comprising a routing key prefix;

receiving a request from the parent or the child to update the pages;

in response to the receiving the request:

issuing a command including a routing key suffix to the KVS to allow any of the parent or the child to update the pages using the naming of the keys;

making, by the parent or the child based on changes received from a source since a last replication cycle, updates to the pages while pages that are not updated remain accessible by any of the parent or the child;

writing the KVS keys to the KVS, the pages stored in the KVS thereby being written with the KVS keys comprising the snapshot id and page number;

creating a snapshot of the parent for the cloning of the logical partition, wherein the creating the snapshot of the parent comprises:

pointing the child to the snapshot;

incrementing the snapshot id to a current snapshot id, the pages stored in the key value store remaining written with the KVS keys comprising the snapshot id and the page number;

upon the parent attempting to write to a page of the pages, comparing a snapshot id in a KVS key of the KVS keys associated with the page to a current snapshot id;

when the snapshot id in the KVS key is less than the current snapshot id, performing a copy-on-write (COW) operation for the write, the COW comprising writing to the KVS a new KVS key, the new KVS key comprising a logical partition id of the parent, the current snapshot id, and the page number; and when the snapshot id in the KVS key is same as the current snapshot id, overwriting the page of the pages;

obtaining the routing keys from a module executed on a computer system to perform a garbage collection; and performing the garbage collection including examining pages of the routing keys, wherein the examining the pages of the routing keys comprises including, in a metadata group, pages of the updated pages referenced by any of the parent or the child when the pages of the parent and the child have a same routing key prefix; and cleaning, based on the examining of the pages at the tree to achieve parallelism in the filesystem, pages that are no longer referenced by any of the parent or the child in the metadata group.

7. The system of claim 6 wherein the keys comprise routing keys, each routing key comprising a routing key prefix, and the processor further carries out the steps of:

grouping the parent and the child into a metadata group;

naming the routing key prefix with a metadata group identifier (id) of the metadata group, the pages of the parent and the child thereby having the same routing key prefix;

receiving a request from the parent to read a page from the key value store, the page being associated with a routing key;

examining a prefix of the routing key to retrieve the page from the key value store for the parent;

receiving a request from the child to read the page from the key value store, the page being associated with the routing key; and examining the prefix of the routing key to retrieve the same page from the key value store for the child.

8. The system of claim 6 wherein the keys comprise routing keys, each routing key comprising a routing key prefix, and the processor further carries out the steps of:

grouping the parent and the child into a metadata group; and naming the routing key prefix with a metadata group identifier (id) of the metadata group, the pages of the parent and the child thereby having the same routing key prefix.

9. The system of claim 6 wherein the keys comprise KVS keys and the processor further carries out the steps of:

naming the KVS keys with a logical partition identifier (id), a snapshot id, and a page number;

writing the KVS keys to the key value store, the pages stored in the key value store thereby being written with the KVS keys comprising the logical partition id, the snapshot id, and the page number;

creating a snapshot of the parent for the cloning;

pointing the child to the snapshot; and incrementing the snapshot id to a current snapshot id, the pages stored in the key value store remaining written with the KVS keys comprising the logical partition id, the snapshot id, and the page number.

10. The system of claim 9 wherein the processor further carries out the steps of:

intercepting a write to a page from one of the parent or the child;

comparing a logical partition id of the one of the parent or the child and a logical partition id in a KVS key associated with the page;

if the logical partition id of the one of the parent or the child is different from the logical partition id in the KVS key associated with the page, performing a copy-on-write (COW) operation for the write;

if the logical partition id of the one of the parent or the child is the same as the logical partition id in the KVS key associated with the page, comparing the current snapshot id and a snapshot id in the KVS key associated with the page; and if the current snapshot id is different from the snapshot id in the KVS key associated with the page, performing the COW operation for the write, wherein the performing the COW operation comprises writing to the key value store a new KVS key, the new KVS key comprising a logical partition id of the one of the parent or the child, the current snapshot id, and the page number.

11. A computer program product, comprising a non-transitory computer-readable medium having a computer-readable program code embodied therein, the computer-readable program code adapted to be executed by one or more processors to implement a method comprising:

creating, at a destination appliance, a clone of a logical partition of a filesystem, the logical partition of the filesystem being a parent, and the clone being a child, wherein the creating the clone of the logical partition includes:

maintaining a key value store (KVS) comprising pages of a B+ tree holding file metadata of the logical partition of the filesystem, the pages being associated with KVS keys through which the pages are retrieved from the key value store;

naming the KVS keys to the pages by inserting different types of identifiers into the KVS keys, wherein the naming the KVS keys includes naming with a snapshot identifier (id) and a page number; and storing, using the naming of the keys, the pages in the key value store to be read by any of the parent or the child, wherein the KVS keys comprise routing keys, each routing key of the routing keys comprising a routing key prefix;

receiving a request from the parent or the child to update the pages;

in response to the receiving the request:

issuing a command including a routing key suffix to the KVS to allow any of the parent or the child to update the pages using the naming of the keys;

making, by the parent or the child based on changes received from a source since a last replication cycle, updates to the pages while pages that are not updated remain accessible by any of the parent or the child;

writing the KVS keys to the KVS, the pages stored in the KVS thereby being written with the KVS keys comprising the snapshot id and page number;

creating a snapshot of the parent for the cloning of the logical partition, wherein the creating the snapshot of the parent comprises:

pointing the child to the snapshot;

incrementing the snapshot id to a current snapshot id, the pages stored in the key value store remaining written with the KVS keys comprising the snapshot id and the page number;

upon the parent attempting to write to a page of the pages, comparing a snapshot id in a KVS key of the KVS keys associated with the page to a current snapshot id;

when the snapshot id in the KVS key is less than the current snapshot id, performing a copy-on-write (COW) operation for the write, the COW comprising writing to the KVS a new KVS key, the new KVS key comprising a logical partition id of the parent, the current snapshot id, and the page number; and when the snapshot id in the KVS key is same as the current snapshot id, overwriting the page of the pages;

obtaining the routing keys from a module executed on a computer system to perform a garbage collection; and performing the garbage collection including examining pages of the routing keys, wherein the examining the pages of the routing keys comprises including, in a metadata group, pages of the updated pages referenced by any of the parent or the child when the pages of the parent and the child have a same routing key prefix; and cleaning, based on the examining of the pages at the tree to achieve parallelism in the filesystem, pages that are no longer referenced by any of the parent or the child in the metadata group.

12. The computer program product of claim 11, wherein the keys comprise routing keys, each routing key comprising a routing key prefix, and the method further comprises:

grouping the parent and the child into a metadata group;

naming the routing key prefix with a metadata group identifier (id) of the metadata group, the pages of the parent and the child thereby having the same routing key prefix;

receiving a request from the parent to read a page from the key value store, the page being associated with a routing key;

examining a prefix of the routing key to retrieve the page from the key value store for the parent;

receiving a request from the child to read the page from the key value store, the page being associated with the routing key; and examining the prefix of the routing key to retrieve the same page from the key value store for the child.

13. The computer program product of claim 11 wherein the keys comprise routing keys, each routing key comprising a routing key prefix, and the method further comprises:

grouping the parent and the child into a metadata group; and naming the routing key prefix with a metadata group identifier (id) of the metadata group, the pages of the parent and the child thereby having the same routing key prefix.

14. The computer program product of claim 11 wherein the keys comprise KVS keys and the method further comprises:

naming the KVS keys with a logical partition identifier (id), a snapshot id, and a page number;

writing the KVS keys to the key value store, the pages stored in the key value store thereby being written with the KVS keys comprising the logical partition id, the snapshot id, and the page number;

creating a snapshot of the parent for the cloning;

pointing the child to the snapshot; and incrementing the snapshot id to a current snapshot id, the pages stored in the key value store remaining written with the KVS keys comprising the logical partition id, the snapshot id, and the page number.

15. The computer program product of claim 11 wherein the method further comprises:

intercepting a write to a page from one of the parent or the child;

comparing a logical partition id of the one of the parent or the child and a logical partition id in a KVS key associated with the page;

if the logical partition id of the one of the parent or the child is different from the logical partition id in the KVS key associated with the page, performing a copy-on-write (COW) operation for the write;

if the logical partition id of the one of the parent or the child is same as the logical partition id in the KVS key associated with the page, comparing the current snapshot id and a snapshot id in the KVS key associated with the page; and if the current snapshot id is different from the snapshot id in the KVS key associated with the page, performing the COW operation for the write, wherein the performing the COW operation comprises writing to the key value store a new KVS key, the new KVS key comprising a logical partition id of the one of the parent or the child, the current snapshot id, and the page number.

* * * * *